(12) United States Patent
Dunning

(10) Patent No.: US 11,707,887 B1
(45) Date of Patent: Jul. 25, 2023

(54) ARTICLE OF FOOTWEAR HAVING A PLATE

(71) Applicant: PUMA SE, Herzogenaurach (DE)

(72) Inventor: Christopher Dunning, Herzogenaurach (DE)

(73) Assignee: PUMA SE, Herzogenaurach (DE)

( * ) Notice: Subject to any disclaimer, the term of this patent is extended or adjusted under 35 U.S.C. 154(b) by 0 days.

(21) Appl. No.: 17/578,752

(22) Filed: Jan. 19, 2022

(51) Int. Cl.
| | |
|---|---|
| *B29C 64/188* | (2017.01) |
| *B29C 43/00* | (2006.01) |
| *B29C 64/165* | (2017.01) |
| *A43B 13/12* | (2006.01) |
| *A43B 1/028* | (2022.01) |
| *B33Y 40/20* | (2020.01) |
| *B33Y 10/00* | (2015.01) |
| *B33Y 80/00* | (2015.01) |
| *B33Y 70/10* | (2020.01) |

(52) U.S. Cl.
CPC ............ *B29C 64/188* (2017.08); *A43B 1/028* (2022.01); *A43B 13/12* (2013.01); *B29C 43/006* (2013.01); *B29C 64/165* (2017.08); *B33Y 10/00* (2014.12); *B33Y 40/20* (2020.01); *B33Y 70/10* (2020.01); *B33Y 80/00* (2014.12)

(58) Field of Classification Search
CPC ..... B29C 64/188; B29C 64/165; B33Y 40/00; B33Y 70/10; B33Y 80/00; A43B 1/028; A43B 13/12
See application file for complete search history.

(56) References Cited

U.S. PATENT DOCUMENTS

| | | | |
|---|---|---|---|
| 10,589,352 B2 | 3/2020 | Mark | |
| 10,814,558 B2 | 10/2020 | Parangi | |
| 11,058,172 B2 | 7/2021 | Ghiotti | |
| 11,147,340 B2 | 10/2021 | Bartel et al. | |
| 11,148,409 B2 | 10/2021 | Mark et al. | |
| 2014/0232035 A1* | 8/2014 | Bheda | B29C 64/118 425/375 |
| 2015/0099025 A1* | 4/2015 | Spalt | B33Y 50/02 425/166 |
| 2019/0200703 A1 | 7/2019 | Mark | |
| 2019/0255612 A1 | 8/2019 | Mark | |
| 2019/0313733 A1 | 10/2019 | Bartel et al. | |
| 2019/0366629 A1* | 12/2019 | Albor | B29C 64/106 |

(Continued)

FOREIGN PATENT DOCUMENTS

CA 3011286 * 7/2020 ............ B33Y 10/00

*Primary Examiner* — Nahida Sultana
(74) *Attorney, Agent, or Firm* — Quarles & Brady LLP

(57) ABSTRACT

A method of manufacturing a component for a sole structure of an article of footwear includes providing a printer having a platform, a first head that receives a first feed, and a second head that receives a second feed. The method further includes printing a base layer on the platform, with the base layer comprising a substrate material and defining a longitudinal axis. Additionally, the method includes printing a first fiber layer continuously on the base layer, with the first fiber layer defining a first fiber orientation that is disposed at a first angle relative to the longitudinal axis, and printing a second fiber layer continuously on the first fiber layer, the second fiber layer defining a second fiber orientation that is disposed at a second angle relative to the longitudinal axis. The first angle is different from the second angle.

20 Claims, 19 Drawing Sheets

(56) References Cited

U.S. PATENT DOCUMENTS

| | | |
|---|---|---|
| 2019/0389090 A1 | 12/2019 | Roy-Mayhew et al. |
| 2020/0023569 A1* | 1/2020 | Hoa .................. B29C 61/0658 |
| 2020/0269506 A1 | 8/2020 | MacMullen et al. |
| 2020/0361155 A1 | 11/2020 | Jones et al. |
| 2020/0371509 A1 | 11/2020 | Mark |
| 2020/0393126 A1 | 12/2020 | Chao et al. |
| 2021/0053116 A1 | 2/2021 | Seleznev et al. |
| 2021/0154738 A1 | 5/2021 | Chao et al. |
| 2021/0178691 A1 | 6/2021 | Mark et al. |
| 2021/0213534 A1 | 7/2021 | Mark et al. |
| 2021/0252776 A1 | 8/2021 | Hoffman et al. |
| 2021/0330593 A1* | 10/2021 | Blaesi .................. A61K 9/4808 |

* cited by examiner

_US 11,707,887 B1_

ARTICLE OF FOOTWEAR HAVING A PLATE

REFERENCE REGARDING FEDERALLY SPONSORED RESEARCH OR DEVELOPMENT

Not applicable

SEQUENCE LISTING

Not applicable

BACKGROUND

1. Field of the Invention

The present disclosure relates generally to an article of footwear including a plate and, more specifically, an article of footwear having a plate formed by an additive manufacturing process to have a customized reinforcement and propulsion pattern.

2. Description of the Background

Many conventional shoes or other articles of footwear generally comprise an upper and a sole attached to a lower end of the upper. Conventional shoes further include an internal space, i.e., a void or cavity, which is created by interior surfaces of the upper and sole, that receives a foot of a user before securing the shoe to the foot. The sole is attached to a lower surface or boundary of the upper and is positioned between the upper and the ground. As a result, the sole typically provides stability and cushioning to the user when the shoe is being worn. In some instances, the sole may include multiple components, such as an outsole, a midsole, and a top portion. The outsole may provide traction to a bottom surface of the sole, and the midsole may be attached to an inner surface of the outsole, and may provide cushioning or added stability to the sole. For example, a sole may include a particular foam material that may increase stability at one or more desired locations along the sole, or a foam material that may reduce stress or impact energy on the foot or leg when a user is running, walking, or engaged in another activity. The sole may also include additional components, such as plates, embedded with the sole to increase the overall stiffness of the sole and reduce energy loss during use.

The upper generally extends upward from the sole and defines an interior cavity that completely or partially encases a foot. In most cases, the upper extends over instep and toe regions of the foot, and across medial and lateral sides thereof. Many articles of footwear may also include a tongue that extends across the instep region to bridge a gap between edges of medial and lateral sides of the upper, which define an opening into the cavity. The tongue may also be disposed below a lacing system and between medial and lateral sides of the upper, to allow for adjustment of the shoe tightness. The tongue may further be manipulable by a user to permit entry or exit of a foot from the internal space or cavity. In addition, the lacing system may allow a user to adjust certain dimensions of the upper or sole, thereby allowing the upper to accommodate a wide variety of foot types having varying sizes and shapes.

The sole may comprise a wide variety of materials, which may be chosen based on one or more intended uses of the shoe. The sole may also include portions comprising varying materials specific to a particular area of the upper. For example, added stability may be desirable at a front of the sole or adjacent a heel region so as to provide a higher degree of resistance or rigidity. In contrast, other portions of a shoe may be soft to provide an area with flexibility, cushioning, and conformity to a user's foot. Further, wearers who suffer from pes planus (a.k.a. flat feet), or other particularities, often add inserts to their shoes to provide more targeted support. This wide variety of user preferences leads to a desire for a shoe that can be customized to provide cushioning, support, and rigidity along different areas, orientations, and zones of the shoe.

However, while many currently-available shoes have varying features related to the above-noted properties, many shoes have sole structures that suffer from a lack of customization, as many shoes include sole structures manufactured in standard sizes and shapes. Further, many athletic shoes, especially running shoes, are manufactured using methods that produce significant amounts of waste.

Therefore, articles of footwear having features that aid in customized properties and are manufactured with minimal amounts of waste are desired. These and other deficiencies with the prior art are outlined in the following disclosure.

SUMMARY

A number of advantages of the articles of footwear described herein will be apparent to those having ordinary skill in the art. An article of footwear, as described herein, may have various configurations. The article of footwear may have an upper and a sole structure connected to the upper.

In some aspects, a method of manufacturing a component for a sole structure of an article of footwear includes providing a printer having a platform, a first head that receives a first feed, and a second head that receives a second feed. The method further includes printing a base layer on the platform, with the base layer comprising a substrate material and defining a longitudinal axis. Additionally, the method includes printing a first fiber layer continuously on the base layer, with the first fiber layer defining a first fiber orientation that is disposed at a first angle relative to the longitudinal axis, and printing a second fiber layer continuously on the first fiber layer, the second fiber layer defining a second fiber orientation that is disposed at a second angle relative to the longitudinal axis. The first angle is different from the second angle. The method also includes treating a printed model in a compression molding process. The printed model comprises at least the base layer, the first fiber layer, and the second fiber layer.

In some embodiments, the first fiber layer comprises at least 60% of substrate material. In other embodiments, the second fiber layer comprises at least 50% of fiber material. Further, the first fiber layer and the second fiber layer define different layer volumes. In some embodiments, the first fiber layer includes at least one of a carbon fiber, an aramid fiber, a boron fiber, or a glass fiber. In some embodiments, the printed model comprises at least five fiber layers. The printed model comprises an arch segment extending between a posterior segment and an anterior segment. Further, a transparent resin is applied to the printed model within the compression mold. The printed model includes a third fiber layer defining a third fiber orientation that is disposed at a third angle relative to the longitudinal axis, the third angle being equal to the first angle and the third fiber layer being separated from the first fiber layer by the second fiber layer.

In some aspects, a plate is provided for a sole structure of an article of footwear that includes an upper having an insole. The plate includes a medial side that is opposite a lateral side, a heel end that is opposite a toe end, a base layer comprising a substrate material, and a plurality of composite layers coupled to the base layer. Each of the composite layers comprises a first volume of base material and a second volume of fiber material. The first volume of base material and the second volume of fiber material are different. Each of the composite layers defines a fiber orientation, the fiber orientation being different between adjacent composite layers. The plate is printed layer-by-layer to define a top side and a bottom side, at least a portion of the top side being spaced apart from the insole of the upper.

In some embodiments, the composite layers are arranged as a stack between a top side and bottom side of the plate and the stack has quasi-isotropic properties. Each of the composite layers has anisotropic properties, the anisotropic properties being different between adjacent composite layers. The anisotropic properties include at least one of a bending resistance, a torsional resistance, or a tensile stiffness. The first volume of base material is less than the second volume of fiber material. The second volume of fiber material includes at least one of carbon fibers, aramid fibers, boron fibers, or glass fibers.

In still another aspect, a method of using a three-dimensional printer and a compression mold for producing a plate for an article of footwear includes providing a feed of substrate material that is fed to a first head of the printer, providing a feed of a fiber material that is fed to a second head of the printer, providing a preformed model on a platform within the printer, and providing a design model to the printer. The first head and the second head are selectively activated and deactivated to print at least two composite layers on the preformed model. The at least two composite layers are separated from the preformed model and received within the compression mold.

In some embodiments, each of the at least two composite layers comprises a continuous fiber strand that is applied by the second head. The plate includes an anterior segment having a first stiffness, an arch segment having a second stiffness, and a posterior segment having a third stiffness. The first stiffness is greater than the second stiffness and the third stiffness is greater than the first stiffness. The first stiffness, the second stiffness, and the third stiffness are equal.

Other aspects of the article of footwear, including features and advantages thereof, will become apparent to one of ordinary skill in the art upon examination of the figures and detailed description herein. Therefore, all such aspects of the article of footwear are intended to be included in the detailed description and this summary.

DETAILED DESCRIPTION OF THE DRAWINGS

Figure 1:
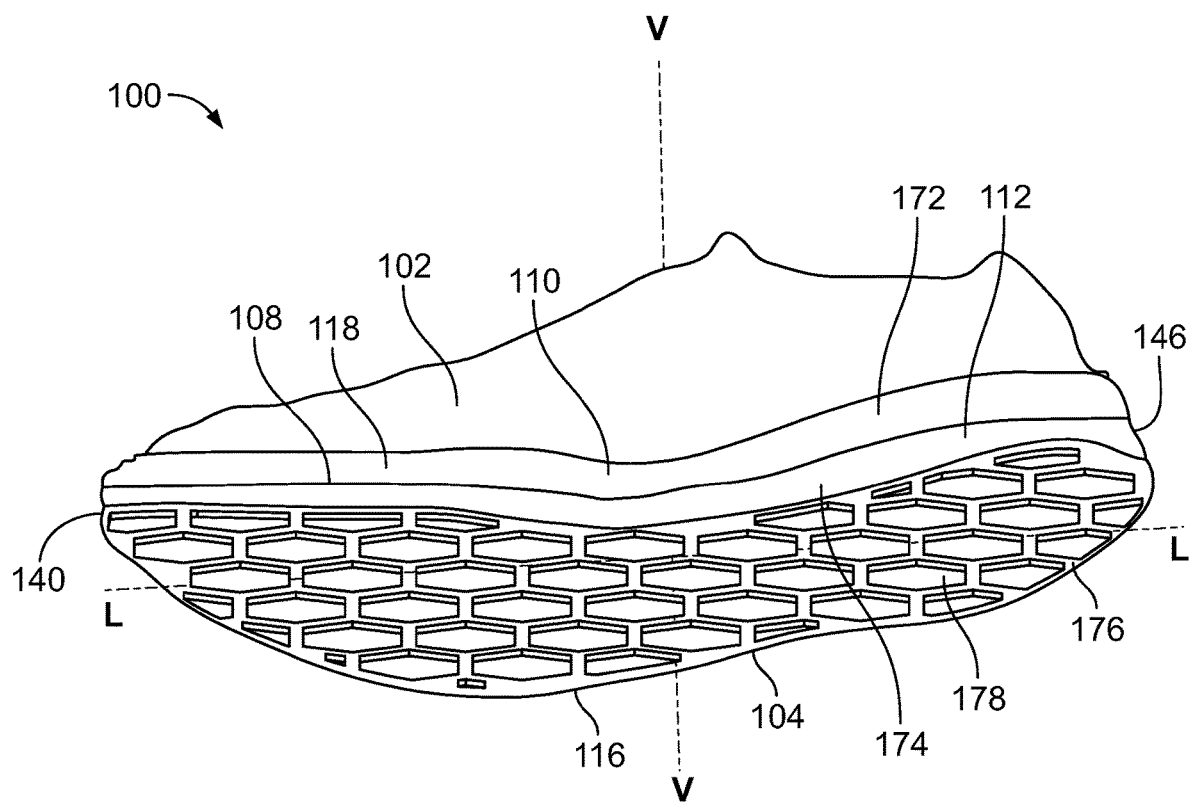
FIG. 1 is a perspective view of a bottom and medial side of an article of footwear configured as a right shoe that includes an upper and a sole structure, according to an embodiment of the disclosure.

The following discussion and accompanying figures disclose various embodiments or configurations of a shoe and a sole structure. Although embodiments of a shoe or sole structure are disclosed with reference to a sports shoe, such as a running shoe, tennis shoe, basketball shoe, etc., concepts associated with embodiments of the shoe or the sole structure may be applied to a wide range of footwear and footwear styles, including cross-training shoes, football shoes, golf shoes, hiking shoes, hiking boots, ski and snowboard boots, soccer shoes and cleats, walking shoes, and track cleats, for example. Concepts of the shoe or the sole structure may also be applied to articles of footwear that are considered non-athletic, including dress shoes, sandals, loafers, slippers, and heels. In addition to footwear, particular concepts described herein may also be applied and incorporated in other types of apparel or other athletic equipment, including helmets, padding or protective pads, shin guards, and gloves. Even further, particular concepts described herein may be incorporated in cushions, backpack straps, golf clubs, or other consumer or industrial products. Accordingly, concepts described herein may be utilized in a variety of products.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

The present disclosure is directed to an article of footwear and/or specific components of the article of footwear, such as an upper and/or a sole or sole structure. The upper may comprise a knitted component, a woven textile, and/or a non-woven textile. The knitted component may be made by knitting of yarn, the woven textile by weaving of yarn, and the non-woven textile by manufacture of a unitary non-woven web. Knitted textiles include textiles formed by way of warp knitting, weft knitting, flat knitting, circular knitting, and/or other suitable knitting operations. The knit textile may have a plain knit structure, a mesh knit structure, and/or a rib knit structure, for example. Woven textiles include, but are not limited to, textiles formed by way of any of the numerous weave forms, such as plain weave, twill weave, satin weave, dobbin weave, jacquard weave, double weaves, and/or double cloth weaves, for example. Non-woven textiles include textiles made by air-laid and/or spun-laid methods, for example. The upper may comprise a variety of materials, such as a first yarn, a second yarn, and/or a third yarn, which may have varying properties or varying visual characteristics.

Figures 2, 3:
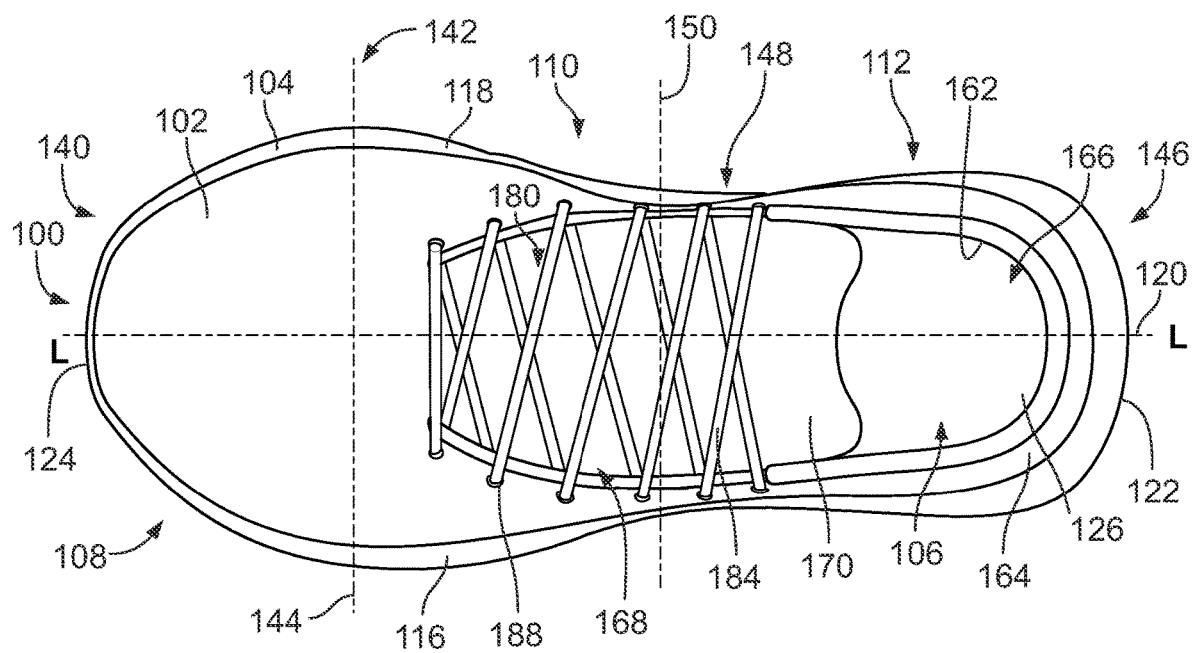
FIG. 2 is a top view of the article of footwear of FIG. 1 configured as a left shoe.
FIG. 3 is a top plan view of the article of footwear of FIG. 2, with an upper removed and a user's skeletal foot structure overlaid thereon.

FIGS. 1-3 depict an exemplary embodiment of an article of footwear 100 configured as a shoe including an upper 102 and a sole structure 104. The upper 102 is attached to the sole structure 104 and together define an interior cavity 106 (see FIGS. 2 and 3) into which a foot may be inserted. For reference, the article of footwear 100 defines a forefoot region 108, a midfoot region 110, and a heel region 112 (see FIGS. 2 and 3). The forefoot region 108 generally corresponds with portions of the article of footwear 100 that encase portions of the foot that includes the toes, the ball of the foot, and joints connecting the metatarsals with the toes or phalanges. The midfoot region 110 is proximate and adjoining the forefoot region 108, and generally corresponds with portions of the article of footwear 100 that encase the arch of the foot, along with the bridge of the foot. The heel region 112 is proximate and adjoining the midfoot region 110 and generally corresponds with portions of the article of footwear 100 that encase rear portions of the foot, including the heel or calcaneus bone, the ankle, and/or the Achilles tendon. For reference purposes, a vertical axis V is illustrated in FIG. 1 as being disposed centrally of the footwear 100 and generally normal or orthogonal to a longitudinal axis L. The vertical axis V extends through the midfoot region 110 of the footwear 100 and, further, defines a vertical plane that is disposed between the forefoot region 108 and the heel region 112. The longitudinal axis L extends through the sole 104 of the footwear 100 and within the forefoot region 108, the midfoot region 110, and the heel region 112. The longitudinal axis L defines a longitudinal plane that is generally normal to the vertical plane of the vertical axis V, and the longitudinal plane L may be disposed tangential to or coplanar with a portion of the sole 104.

While only a single shoe 100 is depicted, i.e., a shoe that is worn on a right foot of a user, it should be appreciated that the concepts disclosed herein are applicable to a pair of shoes (not shown), which includes a left shoe and a right shoe that may be sized and shaped to receive a left foot and a right foot of a user, respectively. For ease of disclosure, however, a single shoe will be referenced to describe aspects of the disclosure, but the disclosure below with reference to the article of footwear 100 is applicable to both a left shoe and a right shoe. However, in some embodiments there may be differences between a left shoe and a right shoe other than the left/right configuration. Further, in some embodiments, a left shoe may include one or more additional elements that a right shoe does not include, or vice versa.

Many conventional footwear uppers are formed from multiple elements, e.g., textiles, polymer foam, polymer sheets, leather, and synthetic leather, which are joined through bonding or stitching at a seam. In some embodiments, the upper 102 of the article of footwear 100 is formed from a knitted structure or knitted components. In various embodiments, a knitted component may incorporate various types of yarn that may provide different properties to an upper. For example, one area of the upper 102 may be formed from a first type of yarn that imparts a first set of properties, and another area of the upper 102 may be formed from a second type of yarn that imparts a second set of properties. Using this configuration, properties of the upper 102 may vary throughout the upper 102 by selecting specific yarns for different areas of the upper 102.

With reference to the material(s) that comprise the upper 102, the specific properties that a particular type of yarn will impart to an area of a knitted component may at least partially depend upon the materials that form the various filaments and fibers of the yarn. For example, cotton may provide a soft effect, biodegradability, or a natural aesthetic to a knitted material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn and other aspects of the yarn may be selected to impart a variety of properties to particular areas of the upper 102.

In some embodiments, an elasticity of a knit structure may be measured based on comparing a width or length of the knit structure in a first, non-stretched state to a width or length of the knit structure in a second, stretched state after the knit structure has a force applied to the knit structure in a lateral direction. In further embodiments, the upper 102 may also include additional structural elements. For example, in some embodiments, a heel plate or cover (not shown) may be provided on the heel region 112 to provide added support to a heel of a user. In some instances, other elements, e.g., plastic material, logos, trademarks, etc., may also be applied and fixed to an exterior surface using glue or a thermoforming process. In some embodiments, the properties associated with the upper 102, e.g., a stitch type, a yarn type, or characteristics associated with different stitch types or yarn types, such as elasticity, aesthetic appearance, thickness, air permeability, waterproofing, or scuff-resistance, may be varied. In some embodiments, the upper 102 is comprised of various layers that are heat pressed together to bond the various layers of the upper 102. For example layers that comprise the upper 102 can be heat pressed together all at once and at a single temperature. The materials that comprise the upper 102 may include an inner mesh layer, a thermoplastic polyurethane (TPU) film, and an outer mesh layer. In some embodiments, a TPU skin may be applied along the outer surface of the upper.

Referring again to FIG. 1, the sole structure 104 is connected or secured to the upper 102 and extends between a foot of a user and the ground when the article of footwear 100 is worn by the user. The sole structure 104 may include one or more components, which may include an outsole, a midsole, a heel, a vamp, and/or an insole. For example, in some embodiments, a sole structure may include an outsole that provides structural integrity to the sole structure, along with providing traction for a user, a midsole that provides a cushioning system, and an insole that provides support for an arch of a user. In addition, the insole may be a strobel board that is attached to the upper by strobel stitching, a forefoot board, a lasting board, etc., or a combination thereof, and the insole may be provided between the upper 102 and the sole structure 104, or the insole may be provided as part of the upper 102.

Furthermore, the insole can be positioned within the interior cavity 106 of the upper 102, which can be in direct contact with a user's foot while an article of footwear 100 is being worn. Moreover, the upper 102 may also include a liner (not shown) that can increase comfort, for example, by reducing friction between the foot of the user and the upper 102, the sole 104, the insole, or the like, and/or by providing moisture wicking properties. The liner may line the entirety of the interior cavity 106 or only a portion thereof. In some embodiments, a binding (not shown) may surround an opening of the interior cavity 106 to secure the liner to the upper 102 and/or to provide an aesthetic element on the article of footwear 100.

Referring to FIGS. 2 and 3, the article of footwear 100 also defines a lateral side 116 and a medial side 118. When a user is wearing the shoes, the lateral side 116 corresponds with an outside-facing portion of the article of footwear 100 while the medial side 118 corresponds with an inside-facing portion of the article of footwear 100. As such, the article of footwear 100 has opposing lateral sides 116 and medial sides 118. The medial side 118 and the lateral side 116 adjoin one another along a longitudinal central plane or axis 120 of the article of footwear 100, which is coplanar with the longitudinal axis L of FIG. 1. As will be further discussed herein, the longitudinal central plane or axis 120 may demarcate a central, intermediate axis between the medial side 118 and the lateral side 116 of the article of footwear 100. Put differently, the longitudinal plane or axis 120 may extend between a rear, proximal end 122 of the article of footwear 100 and a front, distal end 124 of the article of footwear 100 and may continuously define a middle of an insole 126, the sole structure 104, and/or the upper 102 of the article of footwear 100, i.e., the longitudinal plane or axis 120 is a straight axis extending through the rear, proximal end 122 of the heel region 112 to the front, distal end 124 of the forefoot region 108.

Unless otherwise specified, and referring to FIGS. 2 and 3, the article of footwear 100 may be defined by the forefoot region 108, the midfoot region 110, and the heel region 112. The forefoot region 108 may generally correspond with portions of the article of footwear 100 that encase portions of a foot 128 that include the toes or phalanges 130, the ball of the foot 132, and one or more of the joints 134 that connect the metatarsals 136 of the foot 128 with the toes or phalanges 130. The midfoot region 110 is proximate and adjoins the forefoot region 108. The midfoot region 110 generally corresponds with portions of the article of footwear 100 that encase an arch of a foot 128, along with a bridge of the foot 128. The heel region 112 is proximate to the midfoot region 110 and adjoins the midfoot region 110. The heel region 112 generally corresponds with portions of the article of footwear 100 that encase rear portions of the foot 128, including the heel or calcaneus bone 138, the ankle (not shown), and/or the Achilles tendon (not shown).

Still referring to FIGS. 2 and 3, the forefoot region 108, the midfoot region 110, the heel region 112, the medial side 118, and the lateral side 116 are intended to define boundaries or areas of the article of footwear 100. To that end, the forefoot region 108, the midfoot region 110, the heel region 112, the medial side 118, and the lateral side 116 generally characterize sections of the article of footwear 100. Certain aspects of the disclosure may refer to portions or elements that are coextensive with one or more of the forefoot region 108, the midfoot region 110, the heel region 112, the medial side 118, and/or the lateral side 116. Further, both the upper 102 and the sole structure 104 may be characterized as having portions within the forefoot region 108, the midfoot region 110, the heel region 112, and/or along the medial side 118 and/or the lateral side 116. Therefore, the upper 102 and the sole structure 104, and/or individual portions of the upper 102 and the sole structure 104, may include portions thereof that are disposed within the forefoot region 108, the midfoot region 110, the heel region 112, and/or along the medial side 118 and/or the lateral side 116.

Still referring to FIGS. 2 and 3, the forefoot region 108, the midfoot region 110, the heel region 112, the medial side 118, and the lateral side 116 are shown in detail. The forefoot region 108 extends from a toe end 140 to a widest portion 142 of the article of footwear 100. The widest portion 142 is defined or measured along a first line 144 that is perpendicular with respect to the longitudinal axis 120 that extends from a distal portion of the toe end 140 to a distal portion of a heel end 146, which is opposite the toe end 140. The midfoot region 110 extends from the widest portion 142 to a thinnest portion 148 of the article of footwear 100. The thinnest portion 148 of the article of footwear 100 is defined as the thinnest portion of the article of footwear 100 measured across a second line 150 that is perpendicular with respect to the longitudinal axis 120. The heel region 112 extends from the thinnest portion 148 to the heel end 146 of the article of footwear 100.

It should be understood that numerous modifications may be apparent to those skilled in the art in view of the foregoing description, and individual components thereof, may be incorporated into numerous articles of footwear. Accordingly, aspects of the article of footwear 100 and components thereof, may be described with reference to general areas or portions of the article of footwear 100, with an understanding the boundaries of the forefoot region 108, the midfoot region 110, the heel region 112, the medial side 118, and/or the lateral side 116 as described herein may vary between articles of footwear. However, aspects of the article of footwear 100 and individual components thereof, may also be described with reference to exact areas or portions of the article of footwear 100 and the scope of the appended claims herein may incorporate the limitations associated with these boundaries of the forefoot region 108, the midfoot region 110, the heel region 112, the medial side 118, and/or the lateral side 116 discussed herein.

Still referring to FIGS. 2 and 3, the medial side 118 begins at the distal, toe end 140 and bows outward along an inner side of the article of footwear 100 along the forefoot region 108 toward the midfoot region 110. The medial side 118 reaches the first line 144, at which point the medial side 118 bows inward, toward the central, longitudinal axis 120. The medial side 118 extends from the first line 144, i.e., the widest portion 142, toward the second line 150, i.e., the thinnest portion 148, at which point the medial side 118 enters into the midfoot region 110, i.e., upon crossing the first line 144. Once reaching the second line 150, the medial side 118 bows outward, away from the longitudinal, central axis 120, at which point the medial side 118 extends into the heel region 112, i.e., upon crossing the second line 150. The medial side 118 then bows outward and then inward toward the heel end 146, and terminates at a point where the medial side 118 meets the longitudinal, central axis 120.

The lateral side 116 also begins at the distal, toe end 140 and bows outward along an outer side of the article of footwear 100 along the forefoot region 108 toward the midfoot region 110. The lateral side 116 reaches the first line 144, at which point the lateral side 116 bows inward, toward the longitudinal, central axis 120. The lateral side 116 extends from the first line 144, i.e., the widest portion 142, toward the second line 150, i.e., the thinnest portion 148, at which point the lateral side 116 enters into the midfoot region 110, i.e., upon crossing the first line 144. Once reaching the second line 150, the lateral side 116 bows outward, away from the longitudinal, central axis 120, at which point the lateral side 116 extends into the heel region 112, i.e., upon crossing the second line 150. The lateral side 116 then bows outward and then inward toward the heel end 146, and terminates at a point where the lateral side 116 meets the longitudinal, central axis 120.

Still referring to FIGS. 2 and 3, the upper 102 extends along the lateral side 116 and the medial side 118, and across the forefoot region 108, the midfoot region 110, and the heel region 112 to house and enclose a foot of a user. When fully assembled, the upper 102 also includes an interior surface 162 and an exterior surface 164. The interior surface 162 faces inward and generally defines the interior cavity 106, and the exterior surface 164 of the upper 102 faces outward and generally defines an outer perimeter or boundary of the upper 102. The upper 102 also includes an opening 166 that is at least partially located in the heel region 112 of the article of footwear 100, which provides access to the interior cavity 106 and through which a foot may be inserted and removed. In some embodiments, the upper 102 may also include an instep region 168 that extends from the opening 166 in the heel region 112 over an area corresponding to an instep of a foot to an area proximate the forefoot region 108. The instep region 168 may comprise an area similar to where a tongue 170 of the present embodiment is disposed. In some embodiments, the upper 102 does not include the tongue 170, i.e., the upper 102 is tongueless.

Referring to FIG. 1, the sole structure 104 includes a midsole 172 and an outsole 174. In some instances, the outsole may be defined as a portion of the sole 104 that at least partially contacts an exterior surface, e.g., the ground, when the article of footwear 100 is worn. The outsole 174 may define a bottom end or bottom surface 176 of the sole structure 104 across the heel region 112, the midfoot region 110, and the forefoot region 108. Further, the outsole 174 may include a ground-engaging portion or include a ground-engaging surface of the sole structure 104 and may be opposite of the insole thereof. As illustrated in FIG. 1, the bottom surface 176 of the outsole 174 may include a tread pattern 178 that can include a variety of shapes and configurations. The outsole 174 may be formed from one or more materials to impart durability, wear-resistance, abrasion resistance, or traction to the sole structure 104. In some embodiments, the outsole 174 may be formed from any kind of elastomer material, e.g., rubber, including thermoset elastomers or thermoplastic elastomers, or a thermoplastic material, e.g., thermoplastic polyurethane (TPU). In some embodiments, the outsole 174 may define a shore A hardness up to 95. In addition, the outsole 174 may be manufactured by a process involving injection molding, vulcanization, printing layer by layer, i.e., additive manufacturing systems or methods, and the like.

Still referring to FIG. 1, the midsole 172 may be defined as at least a portion of the sole 104 that extends from the outsole 174 toward the upper 102 or that otherwise extends between and connects the outsole 174 with the upper 102. The midsole 172 may be individually constructed from a thermoplastic material, such as polyurethane (PU), for example, and/or an ethylene-vinyl acetate (EVA), copolymers thereof, or a similar type of material. In other embodiments, the midsole 172 may be an EVA-Solid-Sponge ("ESS") material, an EVA foam (e.g., PUMA® ProFoam Lite™, IGNITE Foam), polyurethane, polyether, an olefin block copolymer, organosheets, a thermoplastic material (e.g., a thermoplastic polyurethane, a thermoplastic elastomer, a thermoplastic polyolefin, etc.), or a supercritical foam. The midsole 172 may be a single polymeric material or may be a blend of materials, such as an EVA copolymer, a thermoplastic polyurethane, a polyether block amide (PEBA) copolymer, and/or an olefin block copolymer. One example of a PEBA material is PEBAX®. In some embodiments, the midsole 172 is manufactured by a process involving injection molding, vulcanization, printing layer by layer, i.e., additive manufacturing systems or methods, and the like.

In embodiments where the midsole 172 is formed from a supercritical foaming process, the supercritical foam may comprise micropore foams or particle foams, such as a TPU, EVA, PEBAX®, or mixtures thereof, manufactured using a process that is performed within an autoclave, an injection molding apparatus, or any sufficiently heated/pressurized container that can process the mixing of a supercritical fluid (e.g., $CO_2$, $N_2$, or mixtures thereof) with a material (e.g., TPU, EVA, polyolefin elastomer, or mixtures thereof) that is preferably molten. During an exemplary process, a solution of supercritical fluid and molten material is pumped into a pressurized container, after which the pressure within the container is released, such that the molecules of the supercritical fluid rapidly convert to gas to form small pockets within the material and cause the material to expand into a foam. In further embodiments, the midsole 172 may be formed using alternative methods known in the art, including the use of an expansion press, an injection machine, a pellet expansion process, a cold foaming process, a compression molding technique, die cutting, or any combination thereof. For example, the midsole 172 may be formed using a process that involves an initial foaming step in which supercritical gas is used to foam a material and then compression molded or die cut to a particular shape.

Turning back to FIG. 2, the article of footwear 100 also includes a tightening system 180 that includes a lace 184 and a plurality of eyelets 188. In this embodiment, the lace 184 extends through the plurality of eyelets 188. In some embodiments, the tightening system 180 may include elastic bands. The tightening system 180 may allow a user to modify dimensions of the upper 102, e.g., to tighten or loosen portions of the upper 102 and/or sole 104, around a foot as desired by the wearer. The tightening system 180 may also include a band (not shown) that runs along a center of the upper 102 and includes one or more loops through which the lace 184 may be guided. In other embodiments, the tightening system 180 may be a hook-and-loop fastening system, such as Velcro®. For example, in some embodiments, the tightening system 180 may include one or more hook-and-loop fastening straps. In further embodiments, the tightening system 180 may be another laceless fastening system known in the art. In still further embodiments, the tightening system 180 may include a different manual lacing system, a rotary closure device, or an automatic lacing system, such as the lacing systems described in U.S. patent application Ser. No. 15/780,368, filed on May 31, 2018 and U.S. patent application Ser. No. 16/392,470, filed on Apr. 23, 2019, both of which are hereby incorporated by reference in their entirety.

The present disclosure provides a plate that is manufactured using an additive manufacturing process (e.g., printed layer by layer). The additive manufacturing process incorporates user metrics gathered from various sources (e.g., pressure heat map information, laser scanners, force plates, user preferences, and the like) and continuous fiber fabrication (CFF) manufacturing techniques to optimize the plate to a particular user's performance preferences for propulsion, stability, and comfort, among other preferences. Additive manufacturing enables the plate to be manufactured with minimized waste as compared with traditional, subtractive manufacturing process (e.g., injection molding, milling, grinding, and the like). Further, additive manufacturing enables the plate to be manufactured with reduced steps and iterations, avoiding excessive labor that would typically be required for customized, unique designs optimized for particular user preferences. In addition, the CFF manufacturing techniques enable the plate to be manufactured efficiently and affordably while using expensive, high-performance materials, such as, e.g., carbon fiber, glass fiber, and Kevlar®, among others. Because additive manufacturing involves the addition of material in an iterative process to construct the plate as designed, waste of material and time is minimized. This is particularly important when considering costs associated with expensive materials like carbon fiber and Kevlar®, and also when considering the availability of supplies and/or shipping of such materials on an as-needed basis. By reducing waste, users can source materials in more accurate quantities and with greater predictability, while also saving on shipping costs and resulting emissions and/or pollution associated with the shipping and transport of expensive materials over long distances, e.g., globally.

Additive manufacturing using CFF is preferred for manufacturing a plate according to the present disclosure. The additive manufacturing process may be carried out using a 3D printer, such as printers manufactured by MarkForged®, which is capable of receiving a design model and generating printing instructions to 3D print the plate. A design model may be an electronic three-dimensional representation of a plate that is intended to be formed for an article of footwear. In some embodiments, the design model may be in the form of a 3DCAD file, or a 3D stereolithographic file (.STL file), or any file compatible with a web-based or cloud-based design program, such as Eiger™ offered by MarkForged®.

Alternatively or additionally, the design model may be generated by the controller in response to input data. For example, the physical characteristics that are gathered and entered into the software and used to design and generate a design model may include an end users weight, an end users gait, and/or an end users foot pressure map measured during standing, walking, cutting movements, and/or running. Additionally, various measurements of the foot may be recorded to determine suitable dimensions of the plate, and other aspects of the footwear, as well as data associated with the gait of the foot may be obtained to determine if the foot orientation is indicative of toe striking or heel striking, among other scenarios. The foot measurements and data may be used to determine optimal geometries and performance properties of the plate, as well as the optimal position of the plate within the footwear. Moreover, measurements and data collected may be used for the selection of materials comprising the plate. Further, the additive manufacturing processes described herein allow for tailoring of the stiffness of the plate for a particular wearer based on the measurements and data collected. For example, the tendon stiffness and calf muscle strength of a user can be measured to determine a suitable stiffness of the plate for use by the wearer. Further, the stiffness of the plate can be tuned based on biomechanics and running mechanics of a particular user, such as how the angles of the wearer's joints change during movements, such as through dorsiflexion and plantarflexion. In some examples, force and motion measurements of the wearer are obtained before manufacturing a custom plate for the user. In other examples, plates are manufactured in increments of stiffness to provide semi-custom footwear such that the individual wearers may select a suitable stiffness.

Various alternative methods of additive manufacturing methods that can be used to manufacture a plate for an article of footwear according to the present disclosure may include binder jetting, direct energy deposition, selective laser melting (SLM), fused deposition modeling (FDM), electron beam melting, laser powered bed fusion (LPBF), ultrasonic additive manufacturing, material extrusion, material jetting, Joule printing, electrochemical deposition, cold spray metal printing, DLP metal printing, Ultrasonic Consolidation or Ultrasonic Additive Manufacturing (UAM), LENS laser-based printing, vat photopolymerization, sheet lamination, or electron beam freeform fabrication (EBF3).

As used herein, the term "stiffness" refers to the way in which a component resists deformation when a load is applied. In particular, "stiffness" will be discussed herein with respect to elastic deformation, i.e., temporary deformation that is considered non-destructive. Therefore, "stiffness" may be used in harmony with the terms "resistance" and "strength." Further, "stiffness" may be described herein with respect to various directions, types of deformation, material properties, and the like. For example, the "stiffness" of a component may be broken down into flexural stiffness, tensile stiffness, or shear stiffness. Further, the "stiffness" of a component is correlated to the modulus of elasticity (E) of the materials used, where modulus of elasticity can be quantified by the Young's modulus formula $$E = \frac{\sigma}{\varepsilon},$$

where $\sigma$ is uniaxial stress, i.e., force per unit surface, and $\varepsilon$ is strain, i.e., proportion deformation. For purposes of clarity, "stiffness" may be further specified herein to refer to particular types of resistance, such as bending resistance BR and torsional resistance TR. In some instances, the "stiffness" of a component may be quantified or calculated with respect to a dimension, a mass, or a volume. For example, the "stiffness" of a component may be measured in units of Newtons per millimeter (N/mm), or in units of gigapascals (GPa), although other units may be used. Further, "stiffness" may be referenced qualitatively as being high or low, while also being understood in relation to various aspects of footwear, such as comfort, support, stability, rigidity, and durability, among others.

Figure 4:
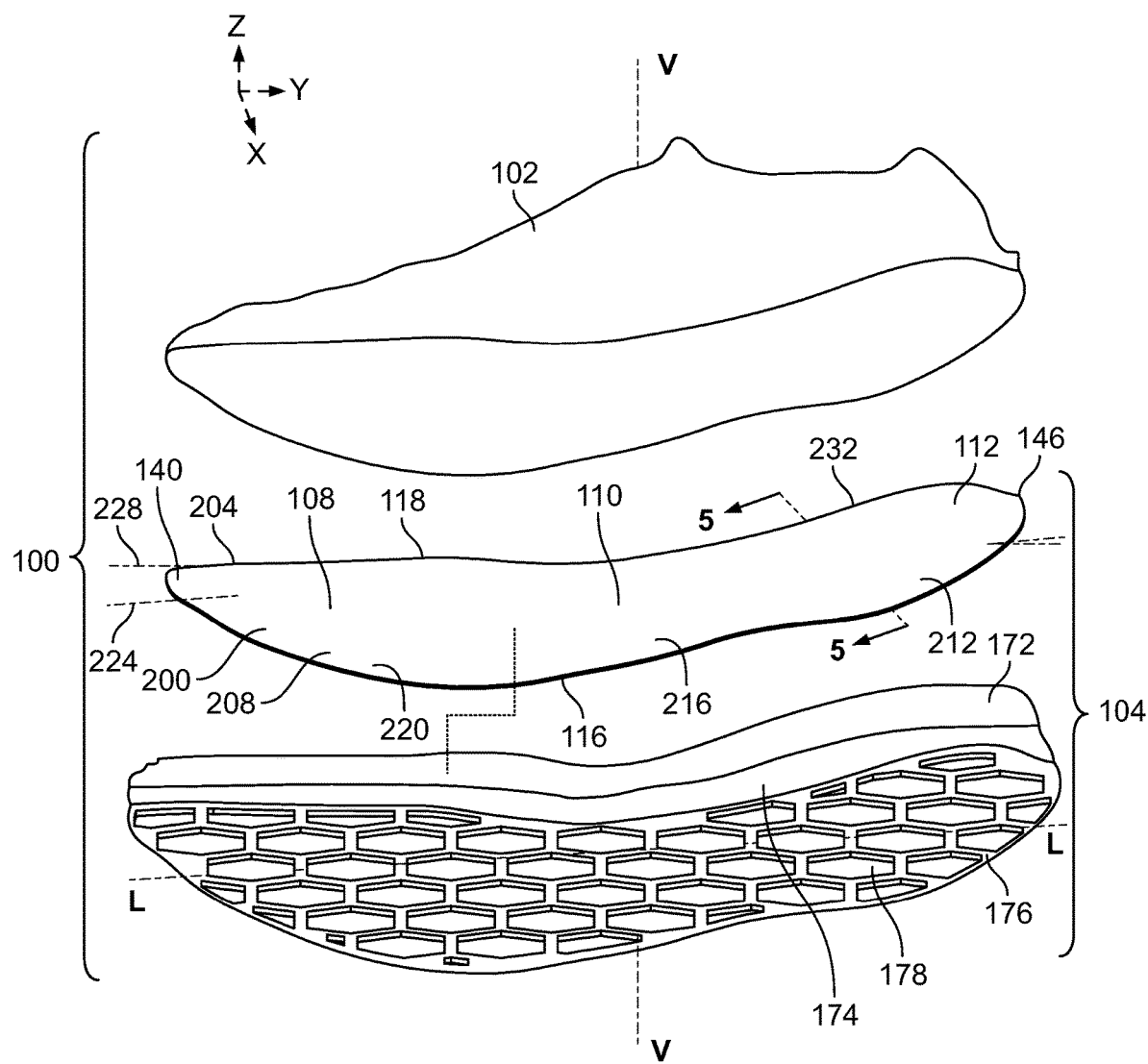
FIG. 4 is an exploded view of the article of footwear of FIG. 1 showing a plate according to an embodiment of the present disclosure.

FIG. 4 depicts an exploded view of the article of footwear 100 including a plate 200, according to an embodiment of the present disclosure. The plate 200 includes a top side 204 that is opposite a bottom side 208 and a posterior segment 212, an arch segment 216, and an anterior segment 220. The posterior segment 212 may extend through at least the heel region 112 of the footwear 100 when incorporated therein and may correspond with portions of the plate 200 positioned near rear portions of a foot, as previously discussed herein. The arch segment 216 of the plate 200 is proximate to and adjoins the posterior segment 212, and corresponds with portions of the plate 200 positioned near the midfoot region 110 of the footwear 100 that encase the arch of the foot, along with the bridge of the foot. The anterior segment 220 of the plate 200 is proximate to and adjoins the arch segment 216, and corresponds with portions of the plate 200 positioned near the forefoot region 108 of the footwear 100 that encase the toes, the ball of the foot, and joints connecting the metatarsals with the toes or phalanges. The plate 200 defines a longitudinal reference axis 224 that intersects the plate 200 at the heel end 146 and the toe end 140. Also, the plate 200 defines a centerline axis 228 that bisects the heel end 146 and the toe end 140, such that the reference axis 224 extends at an angle relative to the centerline axis 228.

In the illustrated embodiment, the plate 200 is embedded within the midsole 172, as indicated by the dashed explode line indicating an approximate location within the midsole 172. However, in some embodiment, the plate 200 may be fitted between the midsole 172 and the upper 102, or between the midsole 172 and the outsole 174, or the plate 200 may be configured as an outsole 174 that is attached to the upper 102, or the plate 200 may be included as part of the upper 102.

For purposes of clarity, directional coordinates X, Y, and Z will be referenced in this disclosure. In particular, the X direction corresponds to the lateral-to-medial direction that is orthogonal to a longitudinal direction in which the longitudinal reference axis 224 extends, the Y direction corresponds to the longitudinal direction that is parallel with the longitudinal reference axis 224, and the Z direction corresponds to a vertical direction that is orthogonal to the X and Y directions. Further, the term "in-plane" will be used herein to refer to a 2-dimensional plane that extends in the X direction and the Y direction, to which the Z direction is orthogonal. Additionally, it will be understood that the longitudinal reference axis 224 also defines a longitudinal reference plane extending vertically in the Z direction. With reference to FIGS. 1 and 4, it will be appreciated that the longitudinal plane defined by the longitudinal axis L may be coplanar with the in-plane directions or portions of the footwear 100. Further, the vertical plane defined by the vertical axis V may extend in the Z direction and be generally normal to the in-plane directions and the longitudinal plane.

The plate 200 defines a periphery 232 that curves outwardly relative to the centerline axis 228 from the heel end 146 toward the lateral side 116 within the heel region 112 to at least partially define the posterior segment 212. The periphery 232 extends farther along the lateral side 116 toward the midfoot region 110 and curves inwardly relative to the centerline axis 228 to at least partially define the arch segment 216. Additionally, the periphery 232 extends within the forefoot region 108 and curves outwardly before curving inwardly toward the toe end 140 to at least partially define the anterior segment 220. Similarly, the periphery 232 curves outwardly from the heel end 146 to toward the medial side 118 within the heel region 112 to at least partially define the posterior segment 212. The periphery extends farther along the medial side toward the midfoot region and curves inwardly to at least partially define the arch segment 216. Additionally, the periphery 232 extends within the forefoot region 108 and curves outwardly before curving inwardly toward the toe end 140 to at least partially define the anterior segment 220. Accordingly, the periphery 232 extends continuously across the entire plate 200 from the posterior segment 212 to the anterior segment 220 and vice versa and from the lateral side 116 to the medial side 118 and vice versa. In some embodiments, a plurality of peripheral elements 236 (see FIG. 5A) may be disposed along portions of the periphery 232, or along the entire periphery 232. In other embodiments, the plate 200 does not include any peripheral elements 236 along the periphery 232.

Figure 5A:
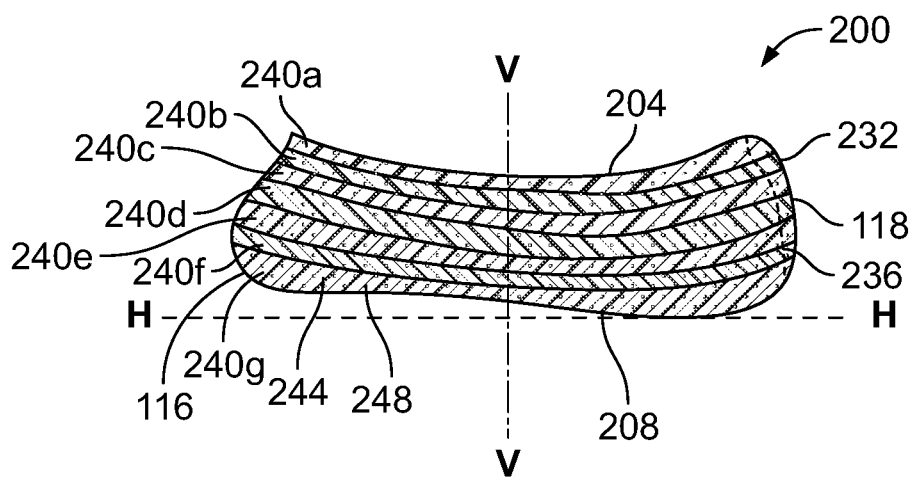
FIG. 5A is a section view of the plate taken along the line 5-5 in FIG. 4.

In particular embodiments, however, the plate 200 may be formed from an additive manufacturing process in which various layers of the plate 200 are printed during a printing process, such as any of the additive manufacturing processes mentioned above. Referring to FIG. 5A, the plate 200 includes a plurality of composite layers 240a-g arranged sequentially in a vertical stack between the top side 204 and the bottom side 208. Throughout the present disclosure, the plurality of composite layers 240a-g may be referenced as composite layers 240 and, further, as reinforced layers, both collectively and individually. Each of the composite layers 240 extends continuously from the medial side 118 to the lateral side 116 and from the posterior segment 212 to the anterior segment 220. However, in other embodiments, some composite layers 240 may be discontinuous between the medial side 118 and the lateral side 116, discontinuous between the posterior segment 212 and the anterior segment 220, or some combination thereof.

In FIG. 5A, the plate 200 is depicted as including seven composite layers 240a-g. However, the plate 200 may include greater or fewer composite layers than illustrated. In some embodiments, the plate 200 includes only three composite layers, while in other embodiments the plate 200 includes one hundred composite layers or one thousand composite layers or more. Further, in some embodiments, the plate 200 is comprised of thousands of composite layers in certain portions or regions, while in other portions or regions of the plate 200 there are fewer composite layers. In the illustrated embodiment, the vertical plane V is disposed centrally between the lateral side 116 and the medial side 118 of the plate 200, and a horizontal plane H is disposed normal to the vertical plane V and tangential to or coplanar with a portion of the bottom side 208 of the plate 200. In this particular instance, the plate 200 has a geometry in which the top side 204 of the plate 200 is curved relative to the horizontal plane H between the medial side 118 and the lateral side 116, while the composite layers 240 each have varying curvatures between the medial side 118 and the lateral side 116 that may differ from one another and from the curvature of the top side 204. Further, the bottom side 208 defines a varying curvature relative to the horizontal plane H between the lateral side 116 and the medial side 118. Also, the periphery 232 of the plate 200 is curved along the lateral side 116 and the medial side 118.

With reference to FIG. 5A, the plate 200 comprises at least a substrate or substrate material 244 and a fiber or fiber material 248. It will be appreciated that the substrate material 244 may be referred to herein as a filler material base material, or matrix. Further, it will be appreciated the fiber 248 may be referred to herein as a fiber strand, filament, or thread. The plate 200 includes composite layers 240a-g having different properties and/or compositions from one another, or at least from an adjacent composite layer 240a-g. To that end, each composite layer 240a-g of the plate 200 has a variety of measurable properties that include a layer volume VL, a substrate percentage SPL of the VL, a fiber percentage FPL of the VL, a layer fiber orientation or operative direction FOL, a layer axial effective elastic modulus EAL, a layer transverse effective elastic modulus ETL, and a layer thickness TL. Additionally, the plate 200 has a variety of measurable properties that include a total volume VT, a total substrate percentage SPT, a total fiber percentage FPT, a total effective fiber orientation or operative direction FOT, a total axial effective elastic modulus EAT, a total transverse effective elastic modulus ETT, and a total thickness TT.

In some embodiments, the plate 200 may be formed from a composite or one or more layers of fibers, such as carbon fibers, aramid fibers, e.g., Kevlar®, boron fibers, glass fibers, natural fibers, and polymer fibers, or a combination thereof. In these embodiments, the fibers may be affixed or bonded to a substrate of plastic material, such as, e.g., nylon, epoxy, or ultra-high-molecular-weight-polyethylene (UHMWPE), or a textile material or composite, among other suitable materials. In some embodiments, the fiber material 248 is fused, by way of heat and pressure, to the substrate material 244 during the additive manufacturing process. In other embodiments, the fiber material 248 is stitched, embroidered, adhered, cemented, woven, fastened, or otherwise attached to the substrate material 244 and/or to fiber material 248. In some embodiments, the plate 200 may be formed from a unidirectional tape that includes carbon fibers, aramid fibers such as Kevlar®, boron fibers, glass fibers, polymer fibers, or any other material having high strength-to-weight properties.

In the illustrated embodiment, each of the composite layers 240a-g differs in at least one measurable property from the adjacent composite layer 240a-g, as indicated by the different hatching used to represent each composite layer 240a-g. In some embodiments, one or more composite layers 240a-g are identical but separated by one or more intervening composite layers 240a-g having different measurable properties. As illustrated in FIG. 5A, the bottom side 208 may be defined entirely by one composite layer 240g, although in other embodiments the bottom side 208 may be defined by portions of two or more composite layers 240. In a similar fashion, the top side 204 may be defined entirely by one composite layer 240a or, alternatively, by portions of two or more composite layers 240. Further, each composite layer 240a-g may be exposed on the lateral side 116 and the medial side 118, although in some embodiments one or more of the composite layers 240a-g may be concealed or recessed relative to the medial side 118 and/or the lateral side 116. Additionally, the composite layers 240a-g may be interrupted by voids (not shown) that intersect or separate one or more of the composite layers 240a-g. The plate 200 may be manufactured as an auxetic arrangement or structure with voids (not shown) and composite layers 240 that allow for auxetic behavior, i.e., increasing in a lateral dimension when stretched in a longitudinal direction, or vice versa. Further, the plate 200 can be manufactured with channels (not shown) to allow for airflow through a portion of the plate 200.

Figure 5B:
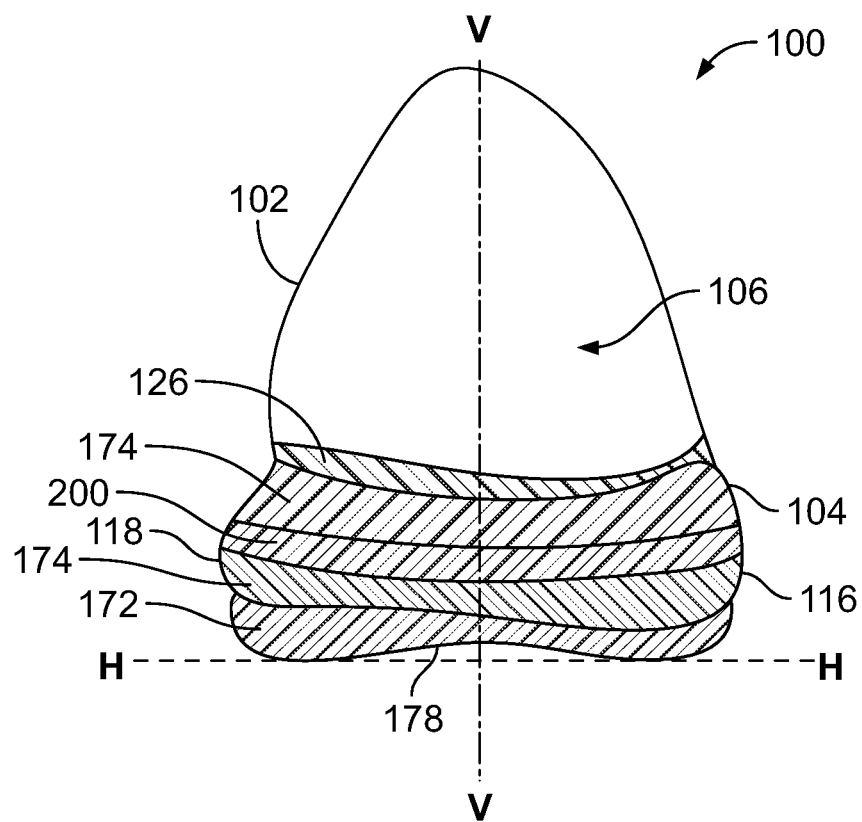
FIG. 5B is a section view of the article of footwear taken along the line 5-5 in FIG. 4.

In the illustrated embodiment of FIG. 5B, the plate 200 is embedded within the sole 104 of the article of footwear 100 and, more specifically, the plate 200 is embedded within the midsole 172 of the sole 104. Further, the upper 102 includes the insole 126 in a strobel arrangement such that the insole 126 is spaced apart from and does not directly contact the plate 200. In some embodiments, the plate 200 can be embedded within the midsole 172 in a manner allowing for portions of the plate 200 to be in contact with the insole 126 or upper 102. Further, in some embodiments, portions of the plate 200 may be in contact with the outsole 174. In other embodiments, the plate 200 may be provided as part of the upper 102. For example, the plate 200 may be included as part of the insole 126 or inserted within the cavity 106 of the footwear 100 similar to conventional orthotic inserts. In some embodiments, the plate 200 may comprise the entire sole structure 104 of the footwear 100, such that the footwear 100 includes only the upper 102 and the plate 200.

Referring to FIGS. 5A and 5B, the plate 200 is generally curved between the medial side 118 and the lateral side 116 and also curved relative to surrounding components of the footwear 100. For example, the plate 200 curves downwardly toward the horizontal plane H between the lateral side 116 and the vertical plane V and then curves upwardly away from the horizontal plane H between the vertical plane V and the medial side 118, such that the plate 200 is convexly curved relative to the horizontal plane H. Because the horizontal plane H is tangential to the outsole 174 in FIG. 5B, the plate 200 is also convexly curved relative to the outsole 174. However, the plate 200 is concavely curved relative to the upper 102, such that the plate 200 curves farthest away from the upper 102 near the vertical plane V and curves nearest to the upper 102 at the medial side 118 and the lateral side 116. Further, the insole 126 and the plate 200 are depicted as having generally similar curvatures in the footwear 100 of FIG. 5B, although other configurations are possible. Moreover, the midsole 172 at least partially surrounds the plate 200 and defines varying curvatures above and below the plate 200 that, as illustrated, differ from the curvature of the plate 200. In the illustrated embodiment, the insole 126, the midsole 172, the plate 200, and the outsole 174 are all mated together to conform to the curvatures of one another, such that no voids or gaps are disposed therebetween. However, it will be appreciated that voids or gaps may be formed between one of the insole 126, the midsole 172, the plate 200, and the outsole 174, such that the curvatures of insole 126 do not conform to the curvatures of the midsole 172, and so on.

It is further contemplated that the plate 200 may undergo pre-loading or deformation when assembled to the footwear 100. To that end, the curvature of the plate 200 may be changed or reduced during assembly within the sole 104 of the footwear 100 to conform to the curvature of the midsole 172 or the outsole 174 or the insole 126. Comparing FIGS. 5A and 5B, for example, the curvature of the bottom side 208 of the plate 200 is deformed, e.g., inverted from concave to convex curvature, due to assembly with the sole 104 of the footwear 100 in FIG. 5B. As a result, the plate 200 is deformed by the interaction with the sole 104 and experiences stress that can alter or influence the properties, e.g., stiffness and propulsion, in one or more directions during use. Such stress caused by assembly with the footwear 100 can provide reactivity benefits that, when combined with the tuned stiffness and geometry of the plate 200, yield enhanced customization of the plate 200 within the footwear 100. As used herein, the term "reactivity" may refer to the sensitivity of the plate 200 to an applied load, i.e., the external forces applied during use, whether the applied load is due to the weight of the user or due to activities, e.g., running, walking, jumping, changing directions, lifting, and the like, and also refers to the sensitivity of the plate 200 to deformation in one or more directions. In some embodiments, the reactivity of the plate 200 can vary along the anterior segment 220, the arch segment 216, and the posterior segment 212, and reactivity can vary between the lateral side 116 and the medial side 118. In some instances, the arch segment 216 of the plate 200 can be pre-loaded to have increased reactivity, making the plate 200 more sensitive to walking activities in which smaller amounts of deformation is experienced, while still providing increased propulsion and support benefits to the user. In some embodiments, the anterior segment 220 may be provided with increased reactivity to offer maximum propulsion when a user presses off during jumping activities.

In some embodiments, the plate 200 is disposed at an angle between the upper 102 and the outsole 174, such that the anterior segment 220 is spaced farther from the upper 102 than the posterior segment 212. In this way, the posterior segment 212 is positioned vertically higher, i.e., elevated in the Z direction, in relation to the anterior segment 220 and/or the arch segment 216. In this way, the plate 200 may be disposed to promote propulsion or spring-back during use. Further, the plate 200 can be formed in different shapes and with different curvatures along the reference axis 224 and/or between the medial side 118 and lateral side 116 to promote cushioning, propulsion, and support during use.

In some embodiments, the fiber materials 248 of the plate 200 may have a tensile stiffness at least partially defined by a tensile elastic modulus, as measured in accordance with the testing methods defined by the testing standard ASTM D4018, or equivalents. For example, in particular embodiments, the fiber material 248 of the plate 200 may have a tensile elastic modulus of at least 70 GPa, or at least about 85 GPa, or at least about 200 GPa, or at least about 300 GPa. In further embodiments, the fiber material 248 has a tensile elastic modulus of between about 300 GPa and about 400 GPa. Accordingly, the fiber material 248 may have a tensile strength, i.e., stress as defined by an amount of load per unit area, of between about 500 megapascals (MPa) and about 800 MPa, as measured in accordance with the testing methods defined by the testing standard ASTM 3039, or equivalents. Additionally, the fiber material 248 of the plate 200 may have a flexural stiffness at least partially defined by a flexural elastic modulus, as measured in accordance with the testing methods defined by the testing standard ASTM D790 or C651, or equivalents. For example, the fiber material 248 may have a flexural elastic modulus of at least about 22 GPa, or at least about 50 GPa, or at least about 100 GPa, or at least about 200 GPa. In further embodiments, the fiber material 248 has a flexural elastic modulus of between about 50 GPa and about 200 GPa. Accordingly, the fiber material 248 may have a flexural strength, i.e., a stress as defined by an amount of load per unit area, of between about 200 MPa and about 600 MPa, as measured in accordance with the testing methods defined by the testing standard ASTM D790, or equivalents. Further, the fiber material 248 of the plate 200 may have a density of between about 1.2 g/cm$^3$ and about 2.0 g/cm$^3$.

Further, the substrate materials 244 of the plate 200 may have a tensile stiffness at least partially defined by a tensile elastic modulus, as measured in accordance with the testing methods defined by the testing standard ASTM D638, or equivalents. For example, in particular embodiments, the substrate material 244 may have a tensile elastic modulus of at least about 1 GPa, or at least about, 2 GPa, or at least about 4 GPa. Additionally, the substrate materials 244 may have a flexural stiffness defined by a flexural modulus of elasticity, as measured in accordance with the testing methods defined by the testing standard ASTM D790, or equivalents. For example, the substrate material 244 may have a flexural elastic modulus of at least about 1 GPa, or at least about 2 GPa, or at least about 3 GPa. In further embodiments, the substrate material 244 has a flexural elastic modulus of between about 1.4 GPa and about 3.7 GPa. Accordingly, the substrate material 244 may have a flexural strength, i.e., stress as defined by an amount of load per unit area, of between about 50 MPa to about 90 MPa, as measured in accordance with the testing methods defined by the testing standard ASTP D790, or equivalents. In another aspect, the substrate materials 244 of the plate 200 may have a heat deflection temperature, as measured in accordance with the methods defined in the testing standard ASTM D648 Method B, or equivalents. For example, the substrate material 244 may have a heat deflection temperature between about 41 degrees C. and about 150 degrees C. The substrate materials 244 used to form the plate 200 may also have a density of between about 1 g/cm$^3$ and about 1.5 g/cm$^3$.

For reference purposes, the tensile elastic modulus of steel or steel alloys, e.g., ASTM A36 steel, as measured in accordance with testing methods defined by the testing standard ASTM E8, or equivalents, is about 200 Gpa, and such steel has a density of about 7.85 g/cm$^3$. In some embodiments, the tensile elastic modulus of a plate of the present disclosure, as measured in accordance with the testing methods defined by the testing standard ASTM E8, or equivalents, is about 200 Gpa. Accordingly, the plate 200 is configured to have a tensile elastic modulus similar to that of steel, but a density that is less than 25% of the density of steel. Thus, the plate of the present disclosure has a substantially higher strength-to-weight ratio than that of steel, with respect to at least one directional strength characteristic.

The composition of the plate 200 is substantially comprised of the substrate material 244 and the fiber material 248, such that the addition of the substrate percentage SPT and the fiber percentage FPT is about 100% of the total volume TV of the plate 200. Accordingly, where the substrate percentage SPT is about 50%, the corresponding fiber percentage FPT is about 50%. Further, because the fiber material 248 generally has a greater stiffness, e.g., including flexural stiffness and tensile stiffness, than the substrate material 244, the stiffness of the plate 200 can be manipulated by controlling or selecting the composition of the plate 200. To that end, manufacturing the plate 200 using additive manufacturing methods affords for precise and efficient selection of material volumes and arrangements, such that users are able to select the composition of the plate 200 according to the desired stiffness. In some embodiments, the plate 200 can have a substrate percentage SPT of about 75%, which corresponds to a fiber percentage FPT of about 25%, which results in the plate 200 having generally more flexible and elastic properties. This may be desirable where user comfort is prioritized. In other embodiments, the plate 200 can have a fiber percentage of about 75%, which corresponds to a substrate percentage of about 25%, which results in the plate 200 having generally greater stiffness and strength properties. This may be desirable where propulsion and support are prioritized. In some embodiments, the substrate percentage SPT of the plate 200 may range between about 25% and about 99%, and the fiber percentage FPT of the plate 200 may range between about 25% and about 99%.

In some embodiments, the plate 200, and the stiffness thereof, may be selected and designed for a particular user. For example, a stiffness of the plate 200 may be selected based on the particular muscle strength, tendon flexibility, or joint flexibility of a user. In further embodiments, the stiffness of the plate 200 may vary, such that a portion of the plate 200 is stiffer compared to another portion of the plate 200. In some embodiments, the plate 200 is included within the sole 104 of the article of footwear 100. For example, the plate 200 can be embedded within the midsole 172, the outsole 174, or the insole 126. In other embodiments, the plate 200 may be disposed between the insole 126 and the midsole 172, or, alternatively, the plate 200 may be disposed between the midsole 172 and the outsole 174.

In general, plates constructed of composite fiber materials, such as Kevlar®, carbon fiber, and fiberglass, among others, have improved strength-to-weight ratios in comparison to plates made entirely of metals, substrate materials, or without the addition of fibers. However, composite fiber materials are strongest in tension, which is limited to a particular direction, i.e., the axial direction in which the composite fiber material is in tension. Accordingly, composite layers having fiber materials arranged in a single, uniaxial direction are strongest in that direction, but exhibit different, e.g., weaker, properties in other directions. As such, the composite layer is considered to have anisotropic properties, i.e., exhibiting different sets of strength properties in different directions.

Composite laminates or structures manufactured using continuous fiber fabrication (CFF) techniques may exhibit quasi-isotropic (QI) properties, e.g., substantially similar properties in most directions, by way of a construction including multiple layers or plies having arrays of fiber disposed at particular angles relative to a reference plane. In some instances, one or more layers are formed of fiber arrays disposed at 0 degrees relative to the reference plane, some other layers are formed of fiber arrays disposed at +/−45 degrees relative to the reference plane, and still other layers are formed of fiber arrays disposed at 90 degrees relative to the reference plane. Further, anisotropically biased layers may be formed of fiber arrays disposed at 0 degrees, +/−30 degrees, and 90 degrees. Composite laminates with QI properties, i.e., QI laminates, may have substantially isotropic properties in-plane, e.g., increased tensional strength or stiffness, similar to an isotropic material. A substantially QI laminate may include fibers or fiber arrays that are randomly oriented or oriented such that substantially equal strength is provided in all directions of a single plane. In general, a QI laminate includes unidirectional layers, e.g., 3D printed layers, oriented at 0 degrees, 90 degrees, 45 degrees, and −45 degrees, with at least 12.5 percent of the layers disposed in each of these directions. QI properties can also be achieved with layers disposed at 0 degrees, 60 degrees, and 120 degrees, among other configurations.

It will be appreciated that stiffness of the plate 200 and/or its composite layers 240 can be understood in terms of bending resistance BR and torsional resistance TR. Bending resistance BR is the mathematical relationship between a transverse force and deflection, and bending resistance BR may be referred to herein as a spring rate or stiffness. Similarly, torsional resistance TR is the mathematical relationship between twisting force and deflection, and torsional resistance TR may be referred to as a rotational stiffness. It is well-known that the bending resistance BR and torsional resistance TR are proportional to the elastic modulus of a material or composition of materials. Further, the geometry and dimensions are also proportional to the bending resistance BR and torsional resistance TR, depending on the direction and location of the applied load. For example, dimensions that are defined in a parallel direction with the direction of the applied load have a greater impact on the particular resistance, e.g., where bending load is applied in the Z direction and thickness is defined in the Z direction.

Additionally, the bending resistance BR and torsional resistance TR properties of each composite layer 240 are related to the effective elastic modulus values, depending in part on the direction in which the load is applied. For loads applied axially in-plane, i.e., in the X and Y directions, the layer axial effective modulus EAL is most relevant. For loads applied transversely, i.e., in the Z direction, which includes bending deformation, the layer transverse effective modulus ETL is primarily considered. EAL is approximated using the formula EAL=EF×FPL+ES*SPL, where EF is the elastic modulus of the fiber material 248, FPL is the volume fraction of the fiber material 248, EM is the elastic modulus of the substrate material 244, and SPL is the volume fraction of the substrate material 244.

Figure 6:
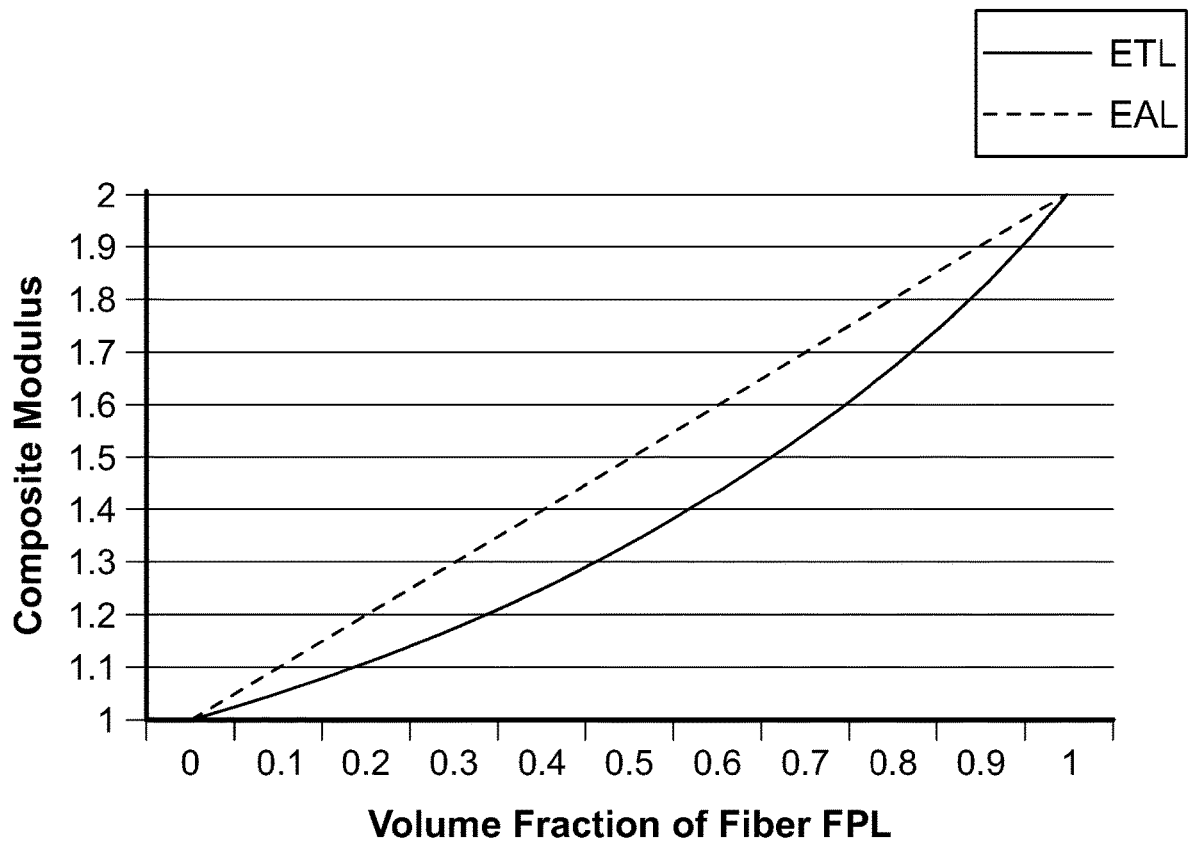
FIG. 6 is a graph illustrating a relationship of elastic modulus to a volume fraction of fiber.

Further, ETL is approximated by using the formula ETL= (EF×ES)/EF×(1−FPL)+(ES*FPL). Accordingly, as the fiber volume fraction FPL approaches the value 1.0, meaning that the fiber material 248 makes up a greater percentage of the volume VL of the composite layer 240, the ETL approaches the value of the elastic modulus EF of the fiber material 248, as illustrated in the graph provided in FIG. 6. Further, the total effective elastic modulus in the axial direction EAT and the total effective elastic modulus in the transverse direction ETT can be approximated for the entire plate 200. To do so, the average of the EAL and ETL of each composite layer 240 is calculated, but each value weighted according to the relationship to the total volume TV of the plate 200 and the offset of the fiber orientation FOL relative to the associated reference plane. Therefore, the composite layers 240 that comprise a greater percentage of the total volume TV of the plate 200 will have a greater influence on the EAT and ETT of the plate 200. Also, composite layers 240 that are offset from the reference plane a greater degree will have less influence on the EAT and ETT. Accordingly, the EAT and ETT can be used to approximate the bending resistance BR and the torsional resistance TR of the plate 200.

Accordingly, the arrangement of composite layers 240 with fiber arrays disposed in different directions allows the plate 200 to exhibit QI properties, e.g., strength or resistance properties that are nearly equal in all directions. For example, when the plate 200 is provided in the sole 104 of the footwear 100, bending occurs due to loading applied in a Z direction and the tendency of the user to arch the heel away from the ground to propel forward off the forefoot. The force is generally orthogonal to the in-plane directions, i.e., the X and Y directions, in which the plate 200 and the fiber material 248 is arranged and, thus, generally orthogonal to the direction(s) in which the composite layers 240 are strongest. However, during such bending, the top side 204 of the plate 200 is in compression and the bottom side 208 is in tension as the downward force, i.e., the load, causes deformation of the plate 200 and the footwear 100. Accordingly, the composite layers 240 arranged near the top side 204 experience compression forces in the longitudinal direction, i.e., the Y direction, and composite layers 240 near the bottom side 208 of the plate 200 experience tension forces in the longitudinal direction, i.e., the Y direction. Thus, to increase the bending resistance BR, the composite layers 240 near the top side 204 can be arranged with fiber material 248 extending in the longitudinal direction, i.e., parallel with the direction in which the compression forces are applied, and the composite layers 240 near the bottom side 208 can be arranged with fiber material 248 extending in the longitudinal direction, i.e., parallel with the direction in which the tension forces are applied.

Further, it may be desired to tune the bending resistance BR and, relatedly, the propulsion afforded by the plate 200. To that end, the composite layers 240 can be arranged in different operative directions FOL, i.e., the direction in which the composite layer is strongest as a result of the axial direction or orientation in which the fiber material 248 extends. The bending resistance BR of the composite layer 240 is greatest when the operative direction FOL is parallel with the longitudinal direction and then gradually decreases as the operative direction FOL is offset, e.g., rotated, away from the longitudinal direction toward an orthogonal direction. Thus, the bending resistance of the composite layer 240 is proportional to the degree at which the operative direction FOL is offset from the bending direction. Further, the combination of composite layers 240 comprising the plate 200 are strongest when all of the operative directions FOL are oriented in parallel with one another and also parallel with the longitudinal direction. However, the stack of composite layers 240 comprising the plate 200 can be tuned to achieve a desired amount of bending resistance BR by arranging some of the composite layers 240 in operative directions that are offset from the longitudinal direction, which allows for greater deflection to occur in response to the applied load, and also provides spring-back or propulsion thereafter.

It is contemplated that the plate 200 may be manufactured using CFF techniques to have localized portions or regions of different properties. For example, the posterior segment 212 of the plate 200 may be manufactured to be stronger than the arch segment 216 and the anterior segment 220. To that end, the posterior segment 212 can be comprised of composite layers 240 that each define greater EAL and ETL properties than composite layers 240 in the arch segment 216 or the anterior segment 220. Further, the posterior segment 212 of the plate 200 may comprise a greater EAT and ETT than in the arch segment 216 and the anterior segment 220. This is possible because the additive manufacturing process using CFF techniques affords for a wide range customization, and control of variables such as, e.g., depositing fiber material 248 in different operative directions FOL, controlling the volume of fiber material 248 within portions and layers, and selecting various materials, among other aspects.

In some embodiments, the EAT and ETT can vary throughout the plate 200 and among the posterior segment 212, the arch segment 216, and the anterior segment 220, as well as between the lateral side 116 and the medial side 118. For example, the plate 200 can be designed for increased propulsion by manufacturing the anterior segment 220 to have a higher EAT and ETT than the arch segment 216, such that the bending resistance BR is greater in the anterior segment 220 than in the arch segment 216. The plate 200, especially the anterior segment 220, undergoes deformation during wear or use, e.g., due to the movements of dorsiflexion and plantarflexion, especially within the metatarsophalangeal joint (MTP) of a user's foot. It is well known that potential energy PE increases as deformation, i.e., bending, of a structure increases, and that potential energy PE is converted to kinetic energy KE as the structure returns to the undeformed state, similar to a spring. As the load decreases or is removed, the anterior segment 220 of the plate 200 springs back to the undeformed state, converting the potential energy PE into kinetic energy KE to generate a propulsion force PF between the ground and the user's foot. The rate at which the plate 200, especially the anterior segment 220, springs back after deformation can be understood as bending resistance BR that is influenced by various properties of the plate 200, e.g., the particular EAT and ETT values within the anterior segment 220. Accordingly, higher EAT and ETT values increase the bending resistance BR and propulsion force PF afforded by the anterior segment 220 of the plate 200. Without the plate 200, the footwear 100 and the MTP joint of the user's foot will often absorb potential energy PE and, thus, less of that potential energy PE is converted to kinetic energy KE during use. However, because of the plate 200 having increased stiffness, e.g., bending resistance BR and torsional resistance TR, more of the potential energy PE generated by the user is converted to kinetic energy KE and, thus, returned to the user.

Figure 7:
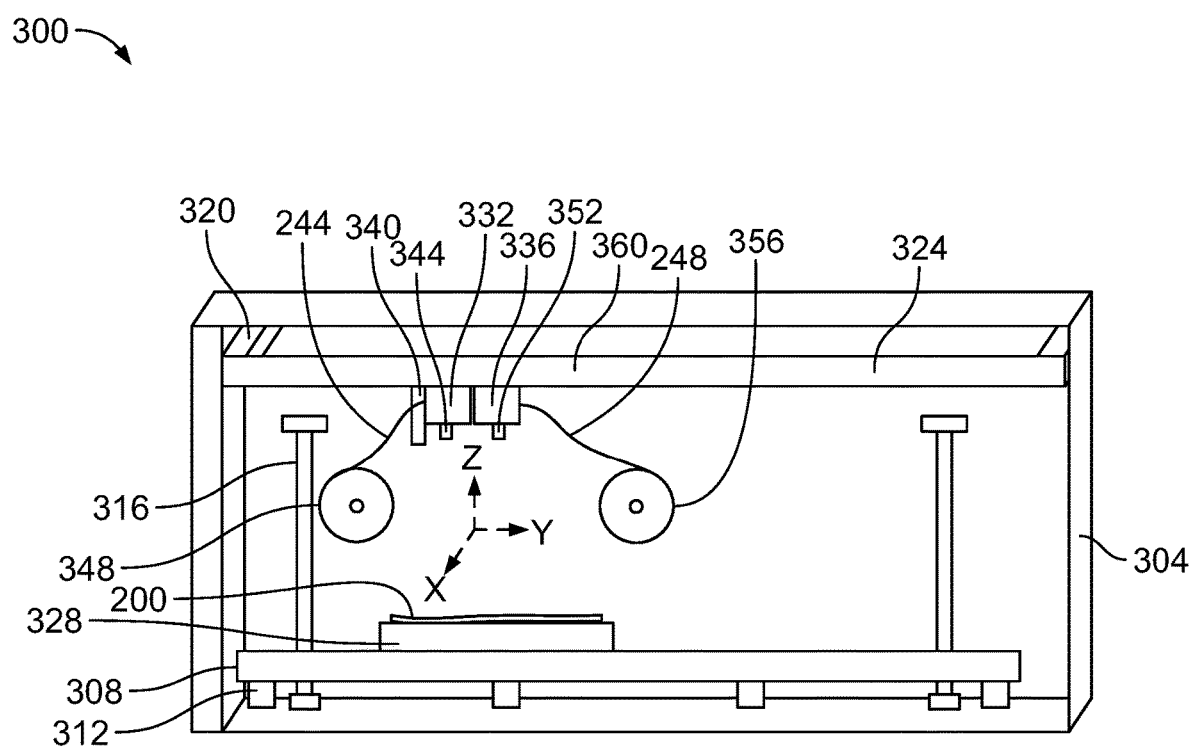
FIG. 7 is a schematic representation of a printer used for additive manufacturing the plate, according to an embodiment of the present disclosure.

With reference to FIG. 7, the plate 200 can be manufactured by a printer 300 that is configured for printing composite structures layer-by-layer. In the illustrated embodiment, the printer 300 includes a housing 304 that contains a print bed or platform 308 therein. The platform 308 is supported by supports 312 and operably engaged with vertical rails 316 that extend generally in the Z direction within the housing 304. The housing 304 further contains lateral rails 320 that extend generally in the X direction and longitudinal rails 324 extending generally in the Y direction. The platform 308 can be translated vertically along the vertical rails 316 by operation of a drive or motor (not shown) contained within the housing 304. A preformed mold or block 328 is supported by the platform 308 within the housing 304.

As illustrated in FIG. 7, the printer 300 further includes a first head 332 and a second head 336 within the housing 304. In the illustrated embodiment, the first and second heads 332, 336 are arranged side-by-side, although other configurations are possible. Additionally, a scanner 340 is provided adjacent the first head 332, although the scanner 340 may be located elsewhere in the housing 304. In some embodiments, the scanner 340 is a laser scanner capable of detecting and measuring dimensions and geometries of objects on the platform 308, although other types of scanners may be used, e.g., 3D cameras, light detection and ranging (LIDAR) devices, and the like. In the illustrated embodiment, the first head 332 includes a first nozzle 344 and cooperates with a first feed 348 located within the housing 304. Additionally, the second head 336 includes a second nozzle 352 and cooperates with a second feed 356 located within the housing 304. The first nozzle 344 and the second nozzle 352 may each include a cutter (not shown) that is capable of chopping or severing the substrate material 244 and/or the fiber material 248 during operation. However, in some embodiments, the cutter (not shown) is provided as a separate component apart from the first nozzle 344 and the second nozzle 352.

In the illustrated embodiment, the first feed 348 and the second feed 356 are provided as bobbins or spools that each hold a particular material, and preferably the first and second feeds 348, 356 hold different materials from one another. In the illustrated embodiment, the first feed 348 holds the substrate material 244 and the second feed 356 holds the fiber material 248, although other configurations are possible. In other embodiments, the printer 300 may include more than two printer heads, or only one printer head. Further, in some embodiments, the printer 300 may also include more than two feeds, or only one feed. In some embodiments, more than one feed cooperates with a single head, while in other embodiments one feed serves more than one head.

The first and second heads 332, 336 and the scanner 340 are operably coupled to the longitudinal rail 324 and the lateral rail 320 to form a chassis 360 that is also capable of vertical translation within the housing 304. The first and second heads 332, 336 are configured to be translated along the longitudinal rail 324 and the lateral rail 320 by a drive motor (not shown), and the chassis 360 is further capable of vertical translation within the housing 304 relative to the platform 308. In addition, the platform 308 can be translated vertically relative to the chassis 360. Thus, the platform 308 and the chassis 360, including the first and second heads 332, 336, are configured to be moved relative to one another to provide a number of degrees of freedom and ranges of motion by way of dedicated motors (not shown) for precise and expedient movement during a printing process.

Referring to FIG. 7, the first head 332 is configured to receive the substrate material 244 stored on the first feed 348 during particular steps or operations of manufacturing. Accordingly, the first nozzle 344 is configured to be compatible with the substrate material 244, such that the first head 332 is configured to be activated to apply the substrate material 244 to a component positioned on the platform 308 by way of the first nozzle 344. In addition, the second head 336 is configured to receive the fiber material 248 stored on the second feed 356 during particular steps or operations of manufacturing. Accordingly, the second nozzle 352 is configured to be compatible with the fiber material 248, such the second head 336 is configured to be activated to continuously apply the fiber material 248 to a component positioned on the platform 308 by way of the second nozzle 352. In some steps or operations, both the first head 332 and the second head 336 are activated simultaneously to apply substrate material 244 and fiber material 248, respectively, to the component on the platform 308. In other steps or operations, only one of the first head 332 and the second head 336 is activated, while the other is deactivated, to apply one of the substrate material 244 and the fiber material 248, respectively. The fiber material 248 may be deposited or applied to fuse to the substrate material 244 and/or to another strand or layer of fiber material 248 during the printing process. Further, pressure may be applied with the second nozzle 352, for example, to continuously compact and direct the fiber material 248 into a desired shape as the fiber material 248 is fused.

The printer 300 includes a controller (not shown) that is programmed to control the printing process based on a set of instructions, e.g., source code, corresponding to a design model for a 3D component, such as the plate 200. In particular, the design model is generated using a software program, e.g., a browser-based or web-based software program, in which aspects of the plate 200 and the printing process are predetermined for use with the printer 300. For example, the plate 200 can be designed within the software according to particular inputs, such as, e.g., foot size, dimensions, shape, contour, rigidity, etc., measured or gathered using various sources, such as, e.g., laser scanner, gait analysis, force profile, images, medical records, and user preferences, among others. Once the inputs are loaded into the software and utilized, e.g., prioritized and considered amongst one another, the software can be used to optimize the design of the plate 200 to fit the user. In some cases, a technician trained to use the software and/or the printer 300 may assist the user in optimizing the plate 200 for particular uses, such as for performance and/or medicinal applications. Subsequently, the software generates the design model in a transferrable format, such as, e.g., a file compatible with the printer 300. The design model is communicated to the printer 300 via an internet connection, a Bluetooth® connection, a radio frequency connection, a USB or ethernet cable, a digital storage disk, or any other medium suited for communication between software and the printer 300.

Figure 8A:
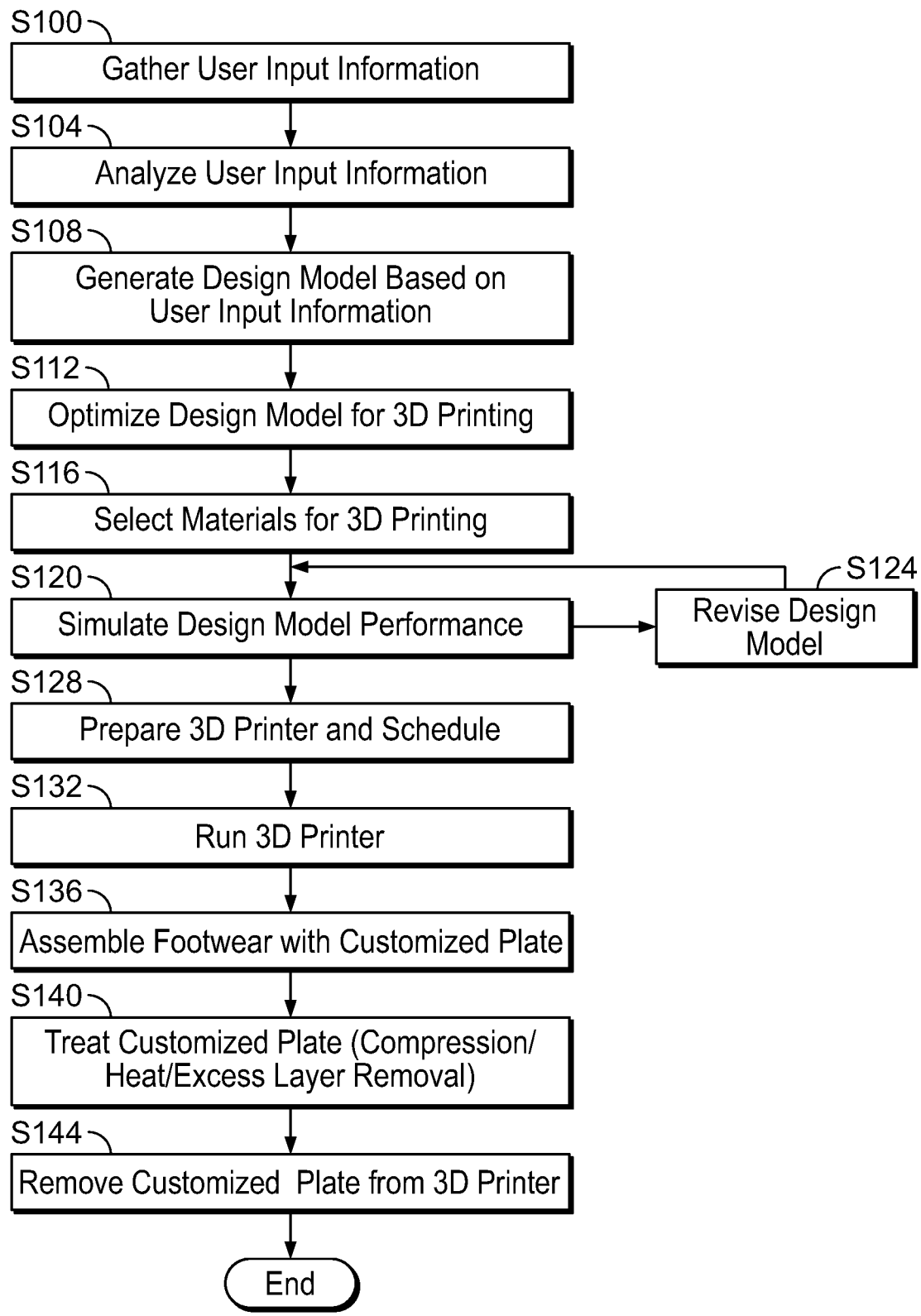
FIGS. 8A and 8B are flow diagrams illustrating processes of printing a plate, according to an embodiment of the present disclosure.

FIG. 8A depicts a flow diagram for an exemplary method of designing and 3D printing a composite plate. In step S100, measurements and preferences are gathered from various sources, such as those described above, and entered as input data into the software program for analysis. In some instances, the software program will be capable of automatically performing step S104 by analyzing the input data to automatically generate an optimized design model for a plate. In other instances, a technician or specialist will assist in performing step S104 by reviewing and modifying the input data to correct for any errors, discrepancies, or unique customization preferences. In step S108, the software program generates a design model based on the input data provided. Accordingly, the design model is the first representation of the customized plate for which various attributes are presented to a user. One important attribute is the material and composition selected for the customized plate of the design model. In step S112, the software program may automatically recommend particular materials based on the input data, but a user may also manually select the materials to be used. For example, because some types of substrate materials 244 or fiber materials 248 are more expensive than others, a user may desire to reduce costs associated with recommended materials.

In step S116, after the design model has been generated and the materials have been selected, the software program is programmed to optimize the design model for 3D printing. In particular, the software program analyzes various aspects of the design model to identify areas requiring further reinforcement, such as edges that may benefit from applying a curvature, e.g., fillet, or apertures that may benefit from additional fiber material 248 being wound therearound. The software program also produces any warnings or notifications related to areas that have a thickness below a minimum thickness threshold associated with the particular materials, geometries, and composite layers 240 specified in the design model. If any warnings and notifications remain unresolved, and depending on the severity, the software program may not permit the user to proceed beyond step S116.

In step S120, a simulation can be performed on the design model in the software program, but this step S120 is optional for a user and need not be performed. In some instances, the simulation can be used to troubleshoot any unresolved warnings or notifications before proceeding, or the user can compare simulation data among various material selections or among various modifications to the input data. In step S124, the user can further revise or modify the input data and material selections, among other aspects, to generate a new design model and, if desired, a new simulation.

In step S128, the user now prompts the software program to generate the design model in a transferrable file format, such as those described above. Further, printing instructions are generated by the software program to communicate with the printer 300, or equivalents. In some embodiments, the printing instructions can be generated by the controller (not shown) of the printer 300 after receiving the digital model from the software program. The user can transfer or send the file, including the design model and the printing instructions, to the printer 300 by various communication methods, such as those noted above.

In step S132, the user activates the printer 300 to begin the printing process in accordance with the design model and printing instructions, which comprises subprocesses that will be described in more detail below. After the printer 300 has completed the printing process, the user removes a printed model of the plate 200 from the printer 300, in step S136, and also separates the printed model from the preformed mold 328, if necessary. The term "printed model" will be used herein to indicate a version of the plate 200 immediately after completion of the printing process, and also to include the plate 200 and an unfinished or untreated version of the plate 200. In some instances, the user will determine whether any treatment is necessary or desired, which will also be described in more detail below. If desired, the user will proceed to treat the printed model of the plate 200, in step S140. Ultimately, when the printed model of the plate 200 is determined to be in a finished state, the plate 200 can be installed in the desired location of the footwear 100.

Figure 8B:
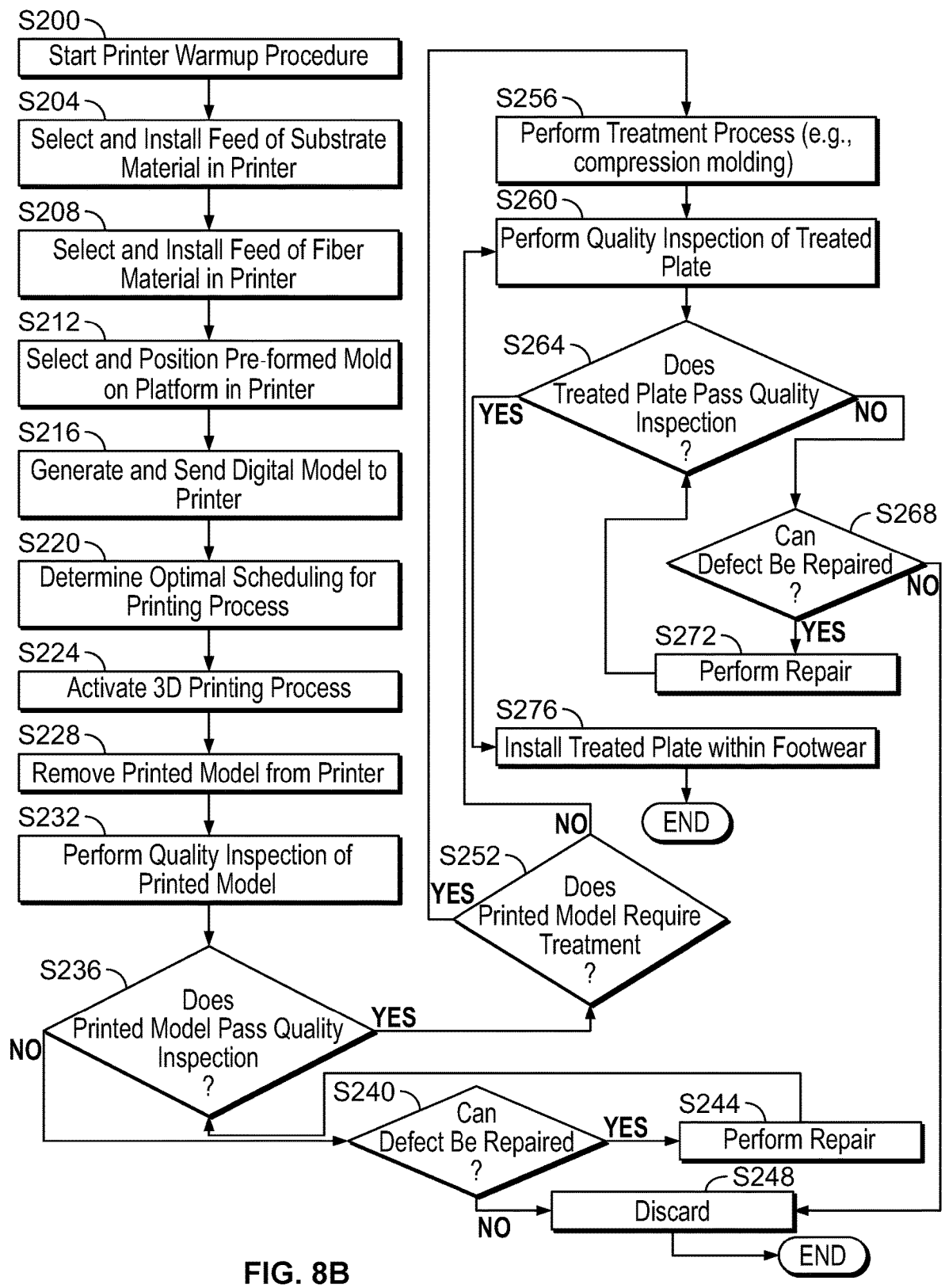

FIG. 8B depicts a flow diagram for an exemplary method of operating the printer 300, which relates to the subprocess of step S132 of FIG. 8A. In step S200, the startup or warmup process is activated after the printer 300 is powered on. The warmup process may take several minutes or more. Then, in step S204, the user selects and installs the first feed 348 with the desired substrate material 244 and the printer 300 feeds the substrate material 244 to the first head 332. Next, in step S208, the user selects and installs the second feed 356 with the desired fiber material 248 and the printer 300 feeds the fiber material 248 to the second head 336. In step S212, the user selects the appropriate preformed mold 328 for the particular component to be printed, e.g., the printed model of the plate 200. Further, the user positions the preformed mold 328 on the platform 308 within the printer 300 in the appropriate orientation. Next, in step S216, the user generates the printing process instructions in the transferrable file format with the software program and sends the file to the printer 300.

In step S220, the user considers the characteristics, such as, e.g., duration, cycles of printing, pauses and/or interruptions, material volume, etc., associated with the printing process instructions and determines when to begin the printing process. The software program can provide a recommended optimal start time to avoid downtimes. For example, the printing process may involve an 8 hour cycle and a 2 hour cycle, so it may be optimal to start the printing process at the end of the workday, e.g., about 5:00 P.M., so the 8 hour cycle can be completed overnight and the shorter 2 hour cycle can be completed the following day. In this way, a user can make the printer 300 available for shorter cycles during the workday, e.g., normal business hours, and also keep the printer 300 productive during non-working hours, e.g., overnight. After considering the characteristics of the printing process and recommendation provided by the software program, the user determines when to activate the printer 300 to begin the printing process.

Next, in step S224, the user activates the printing process and attends to the printer 300 when needed. For example, the printing process may require the user to replenish the first feed 348 of substrate material 244 or to swap out the substrate material 244 with a different type. Then, in step S228, after the printer 300 has completed the printing process, the user can remove the printed model from the printer 300 and separate the preformed model from the printed model of the plate 200. To do so, various hand tools may be used, e.g., screwdrivers, chisels, hammers, and the like. As indicated in step S232, the user performs a quality inspection of the printed model of the plate 200 to identify any defects or risks. In one instance, the quality inspection can include a mere visual inspection of the printed model of the plate 200 to identify any visible defects, such as, e.g., cracks, improper holes or shapes, loose strand ends or loops, and the like. In another instance, the user can perform non-destructive tests on the printed model of the plate 200 to verify that the strength is satisfactory, when compared to the design data, in each direction. Also, the user can measure the weight and/or volume of the printed model to verify the composition in comparison to the design data. Other tests may be performed to identify any defects associated with the printed model and/or deviations from the design data.

In step S236, the user determines whether any defects identified from the quality inspection of step S232 present a significant risk to the performance and/or quality of the printed model. If the user determines the defects present a significant risk, the user may determine whether those defects can be repaired through another process. Further, in step S240, the user may also determine whether the costs, e.g., time and material, associated with the repairs are economical before deciding whether to perform the repairs. If the defects are determined to be repairable and economical, then the user submits the printed model to such repairs, as in step S244, which may involve additional printing processes or treatment processes. In step S248, if the defects are not repairable or uneconomical, the printed model may be discarded, in compliance with any pertinent local regulations. If no defects are present, then the user may proceed to step S252.

In step S252, the user determines whether the printed model should undergo any treatment processes. Such treatment processes may involve the application of a coating, compression to alter characteristics of the printed model, sanding and/or polishing, attaching pins or rods to the printed model to assist with installation in the footwear 100, and other finishing techniques. In step S256, the user performs or arranges to have performed any of the appropriate treatment processes, through which the printed model becomes the finished plate 200. In step S260, after the treatment processes are completed, the user once again performs a quality inspection to identify any defects or risks. If defects are identified, the user again determines whether or not to perform repairs, in step S268. In step S272, the repairs are performed, if valuable and economical. After the repairs are finished, the quality inspection of step S264 is performed again for a final check. If no defects are identified in the quality inspection of step S264, whether after repairs or not, the user proceeds to step S276 where the plate 200, in a finished state, is installed or assembled in the footwear 100.

As part of steps S204 and S208, the user identifies the particular materials, i.e., the substrate material 244 and the fiber material 248, specified by the design model. In doing so, the user may account for the varying costs associated with the substrate material 244 and the fiber material 248. Generally, the fiber material 248 is more expensive and costly than substrate material 244, and in some cases the fiber material 248 can be more rare or difficult to purchase in sufficient quantities. Thus, plates that use copious amounts of fiber materials 248 are often more expensive and, in some instances, more sensitive to supply chain disruptions and resource fluctuation. Further, traditional manufacturing methods involve removal of material and, thus, require greater volumes of excess material to account for such removal, e.g., cutting blanks from larger sheets of material. In contrast, additive manufacturing eliminates the need for such excess materials. Due to the optimized use of fiber material 248 in additive manufacturing methods of this disclosure, such as with CFF techniques, the user is afforded the ability to achieve improved plate performance, e.g., increased and customized stiffness, while minimizing the costs. Thus, the additive manufacturing process of the present disclosure can be optimized according to various factors, including costs, availability, and performance, among others.

Next, the user loads the first feed 348 and the second feed 356 containing the specified materials into the printer 300 and, in particular, the user feeds a portion of the substrate material 244 to the first head 332 from the first feed 348 and also feeds a portion of the fiber material 248 to the second head 336 from the second feed 356.

After the printer 300 is activated in step S224 to commence the printing process, the printer 300 operates according to the instructions associated with the design model to selectively activate the first head 332 and the second head 336 to print the plate 200 layer-by-layer. In some instances, the printer 300 will print the plate 200 from bottom-to-top, such that the bottom side 208 is printed before the top side 204. In other instances, the geometry and/or aspects of the plate 200 are printed layer-by-layer in an inverted orientation, such that the top side 204 is printed before the bottom side 208. Accordingly, the printer 300 directs the first head 332 and the second head 336 to print the composite layers 240 of the plate 200 in an optimized orientation and manner, as informed by the design model. Upon completion of the printing process, the plate 200 is provided in the unfinished state of the printed model composed of the composite layers 240 which may range from two layers to thousands of layers.

Figure 9A:
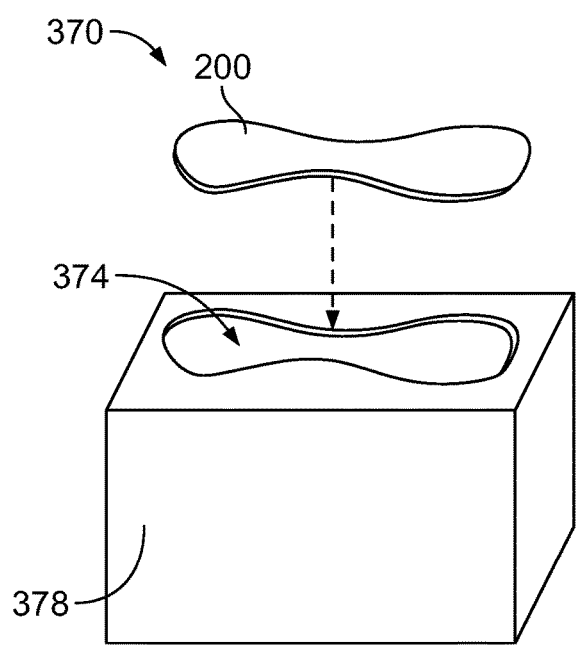
FIGS. 9A and 9B are schematic representations of compression molding components.
Figure 9B:
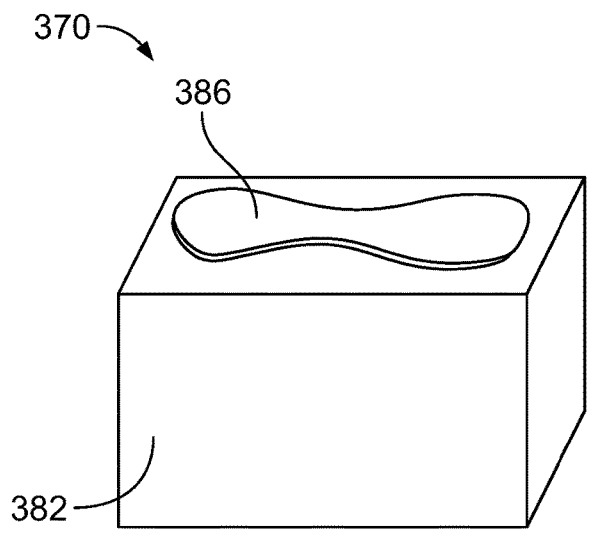

As noted in step S256 and now with reference to FIGS. 9A and 9B, the printed model can be treated within a compression mold 370, such as, e.g., a marriage mold. In particular, the printed model can be received within a negative form 374 of a first block 378 that corresponds to a particular shape and geometry, while a second block 382 is arranged for operation with the first block 378 during a compression molding process. In some aspects, the second block 382 is provided with a positive form 386 that extends from the second block 382 and is configured to protrude into the negative form 374 of the first block 378 during the compression molding process. In other aspects, the second block 382 is provided with a flat surface that encloses the printed model within the negative form 374 of the first block 378.

During the compression molding process, the first block 378 and the second block 382 are compressed against one another with the printed model disposed therebetween. The magnitude of compression, i.e., the force of pressure measured in units of Newtons (N) or pounds per square inch (PSI), can vary over time throughout the compression molding process, or the magnitude of compression may remain constant throughout the compression molding process. In addition, heat may be applied to the printed model via the first block 378 and/or the second block 382, or heat may be applied directly to the printed model. Heat can be applied for various amounts of time, at various temperatures, and through various mediums, e.g., steam, glycol, high-temperature water, high-temperature air, or by way of a heat exchanger. Further, cooling may be applied to the printed model via the first block 378 and/or the second block 382, or cooling may be applied directly to the printed model. Cooling can be applied for various amounts of time, at various temperatures, and through various mediums, e.g., glycol, low-temperature water, low-temperature air, or by way of a heat exchanger.

Further, the compression molding process can include injection of a volume of resin, such as, e.g., a thermoplastic polyurethane (TPU), acrylonitrile butadiene styrene (ABS), epoxy, vinyl, nylon, polyetherimide (PEI), polyether ether ketone (PEEK), polylactic acid (PLA), or liquid crystal polymer, among others, that serves as a coating for the printed model. That is, the printed model may be coated with a resin during the compression molding process. Various aspects of the compression molding process may be tailored or modified to achieve particular coating characteristics or to accommodate particular resin materials. For example, thicker coatings may require a greater amount of time of compression, temperature of heat, and volume of resin for application to the printed model. In some embodiments, the resin material is transparent or translucent, such that the composite layers 240 are visible through the coating. In other embodiments, the resin is opaque and, thus, the composite layers 240 are concealed beneath the coating.

During the compression molding process, the composite layers 240 of the printed mode may react to the compression, heat, and/or coating to alter properties and aspects thereof. For example, the substrate material 244 may have a lower melting point or heat deflection temperature than the fiber material 248. Accordingly, the substrate material 244 of the printed model may melt to be shaped according to the negative form 374 of the first block 378, thereby shaping or forming the plate 200 during the compression molding process. In one example, the compression molding process may cause the printed model to compress and decrease in total thickness TT, such that one or more of the composite layers 240 decreases in thickness TL. It is also contemplated that the substrate material 244 may be heat fused through the compression molding process, such that the composite layers 240 are heat fused to one another during the compression molding process. Accordingly, the compression molding process may transform the composite layers 240 of the plate 200 from discrete layers that are engaged with one another to a monolithic matrix of substrate material 244 in which a plurality of continuous strands of fiber material 248 are impregnated. As a result of the heat fusion during compression molding, the plate 200 may become more rigid and, thus, the stiffness, e.g., bending resistance BR and torsional resistance TR, may be increased.

Further, the fiber material 248 may become entangled or rearranged as a result of the compression molding process, such that the rigidity, flexibility, and directional strength properties of the printed model are altered. It is contemplated that the compression molding process may cause the fiber materials 248 to melt or deform due to the exposure to heat and pressure. It is also contemplated that the fiber material 248 may be heat fused through the compression molding process to the substrate material 244 and/or to surrounding portions of fiber material 248. Accordingly, the compression molding process may transform the composite layers 240 of continuous strands of fiber material 248 from discrete layers disconnected or spaced apart from one another to a monolithic web of fiber material 248 that is impregnated within a matrix of substrate material 244. As a result of the heat fusion during compression molding, the plate 200 may become more rigid and, thus, the stiffness, e.g., bending resistance BR and torsional resistance TR, may be increased. In addition, if a coating is applied to the printed model during the compression molding process, the coating may impart certain properties upon the printed model, such as surface roughness, moisture resistance, or vibration dampening, among other features.

Accordingly, the plate 200 can be formed of various shapes and sizes and provided as part of the footwear 100, such as in the sole 104 or the upper 102. In some embodiments, the plate 200 is provided as part of the upper 102, e.g., as a part of the insole 126. The plate 200 can be configured to be at least partially customized to influence or enhance gait, stance, posture, propulsion, and agility, among other needs. For example, the plate 200 may be configured to alleviate pain and/or improve performance for users with medical issues or deformities. Fiber reinforcement can increase stiffness in a localized area of the plate 200, such as in the posterior segment 212, the anterior segment 220, or the arch segment 216, or some combination thereof. In addition, stiffness can be increased by arrays and orientations of fibers made of generally rigid materials, or by depositing, e.g., printing, fiber materials in arrays that are more compact and dense, or by adding additional composite layers in particular areas, or by depositing fibers about the periphery 232. As such, bending resistance BR and torsional resistance TR, which account for and relate to moment of inertia MOI and elastic modulus values, may be increased and customized for particular applications. Fiber reinforcement can also provide directional stiffness in localized areas of the plate 200 as well as quasi-isotropic QI properties by implementing additive manufacturing methods using CFF techniques.

Example 1

With reference to FIGS. 10-17, an embodiment of a plate 400 is depicted in several unfinished states in which individual composite layers 404 are visible from a top plan view. In particular, the plate 400 is depicted at consecutive stages of an exemplary trial of the additive manufacturing process, i.e., a printing process, as performed in a layer-by-layer configuration using an example CFF technique, a sample of which includes a first composite layer 404a (see FIG. 10), a second composite layer 404b (see FIG. 11), a third composite layer 404c (see FIG. 12), a fourth composite layer 404d (see FIG. 13), a fifth composite layer 404e (see FIG. 14), a sixth composite layer 404f (see FIG. 15), a seventh composite layer 404g (see FIG. 16), and an eighth composite layer 404h (see FIG. 17). As will be appreciated from FIGS. 10-17, the plate 400 defines a centerline axis 228 that bisects the toe end 140 and the heel end 146. The centerline axis 228 is disposed at a centerline angle 408 relative to the reference axis 224. In the illustrated embodiment, the centerline angle 408 is approximately −4 degrees, although other configurations are possible. Further, a variety of aspects were measured during the exemplary trial printing process and recorded in Table 1, below. Accordingly, Layer 1 corresponds to the first composite layer 404a of FIG. 10, and so on.

TABLE 1

| | Total Print Time (min.) | Total Substrate Volume (cm3) | Total Fiber Volume (cm3) | Total Sub. Pct. | Total Fib. Pct. | Layer Thickness (mm) | Layer Print Time (min.) |
|---|---|---|---|---|---|---|---|
| Layer 1 | 65 | 3.28 | 0 | 100.0% | 0.0% | 0.2 | 65 |
| Layer 2 | 87 | 3.33 | 1.52 | 68.7% | 31.3% | 0.1 | 22 |
| Layer 3 | 110 | 3.38 | 3.03 | 52.7% | 47.3% | 0.1 | 23 |
| Layer 4 | 133 | 3.41 | 4.53 | 42.9% | 57.1% | 0.1 | 23 |
| Layer 5 | 155 | 3.46 | 6.04 | 36.4% | 63.6% | 0.1 | 22 |
| Layer 6 | 178 | 3.51 | 7.53 | 31.8% | 68.2% | 0.1 | 23 |
| Layer 7 | 200 | 3.54 | 9.04 | 28.1% | 71.9% | 0.1 | 22 |
| Layer 8 | 223 | 3.59 | 10.55 | 25.4% | 74.6% | 0.1 | 23 |

It will be appreciated that the plate 400 can include several more composite layers in addition to the eight composite layers 404a-h, and that the plate 400 may be subject to the compression molding process in which a coating is applied. It will be appreciated that the term "array," as used herein, can include various types of patterns and arrangements, such as, e.g., a boustrophedon array, a tessellated array of various polygons, a concentric lemniscate pattern, a concentric circular or ellipsoidal pattern, motif of curvilinear geometric shapes, or any other 2D or 3D pattern formed by a continuous strand.

Figure 10:
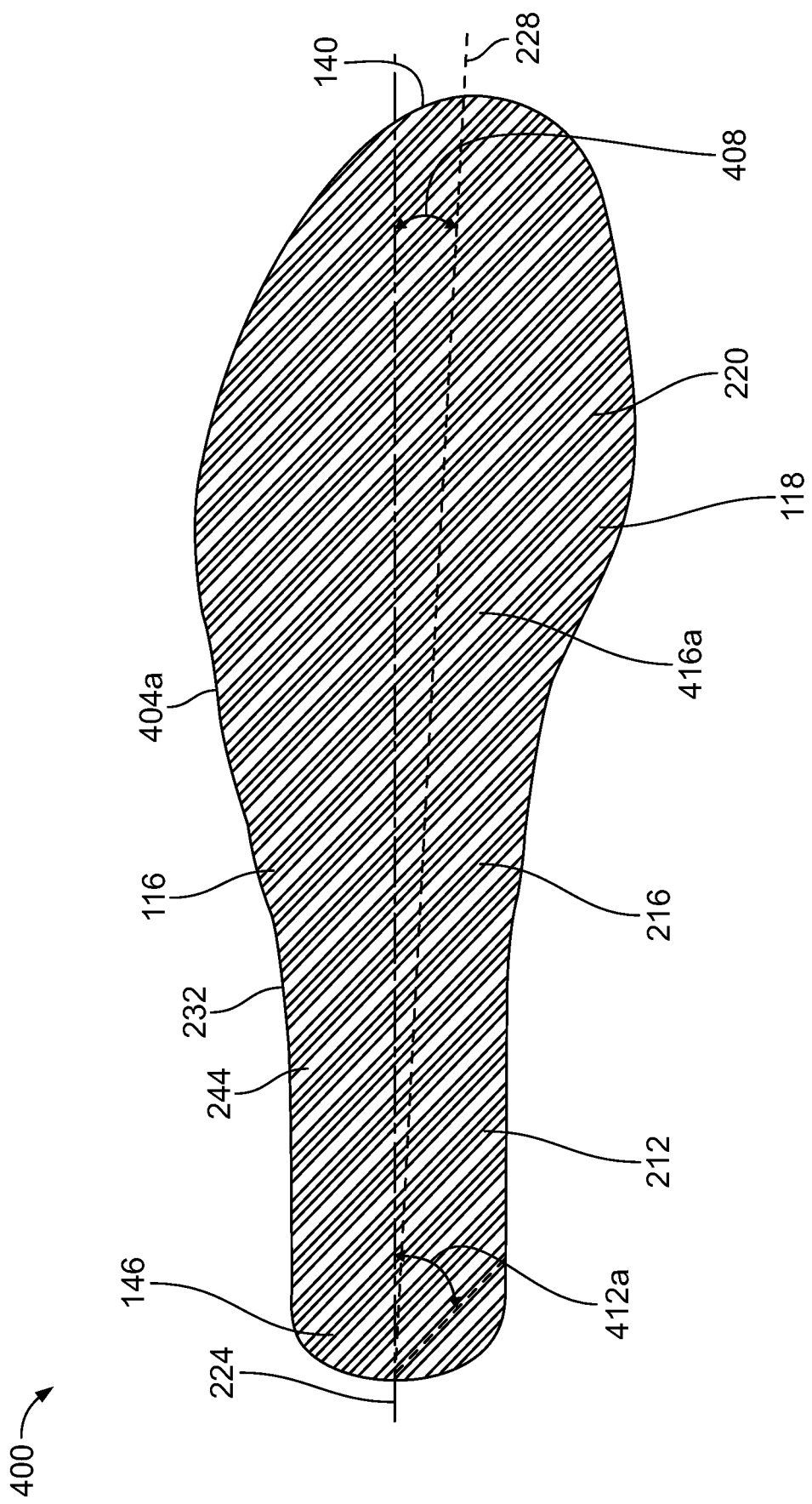
FIGS. 10-17 are schematic representations of a top plan view of several layers of another embodiment of a plate for an article of footwear throughout an exemplary manufacturing process.

With reference to FIG. 10, the first composite layer 404a is a base layer that is composed of strands of substrate material 244 printed in a substrate array 412a that is oriented at a base angle 416a relative to the reference axis 224. The base angle 416a may be about 45 degrees, although other configurations are possible. In the illustrated embodiment, the base layer 404a is composed entirely of substrate material 244 that can serve as a shell or protective layer for encasing the fiber material 248 deposited in subsequent layers (see FIGS. 11-17). However, in some embodiments, the base layer 404a may be removed prior to installation or assembly within the footwear 100.

Figure 11:
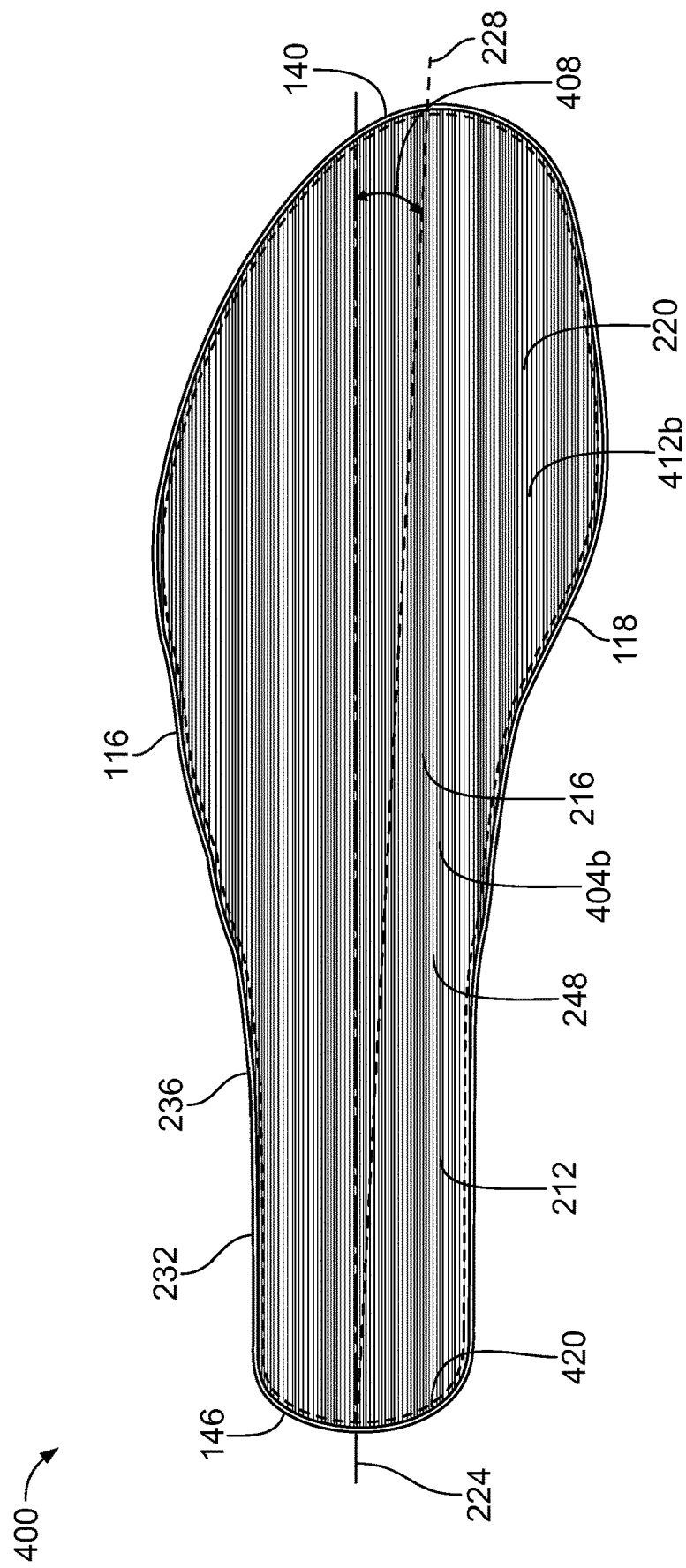

Referring to FIG. 11, the plate 400 includes the second composite layer 404b that comprises a continuous strand of fiber material 248 printed in a first fiber array 412b that is oriented in parallel with the reference axis 224. Thus, the first fiber array 412b is oriented at a first fiber angle 416b (not shown) that is different than base angle 416a. Further, the first fiber array 412b of the second composite layer 404b includes turns 420 in the form of U-shaped hairpin bends arranged along portions of the periphery 232 of the plate 400. Further, the second composite layer 404b includes peripheral elements 236 that are engaged with one or more of the turns 420 along various portions of the first fiber array near the periphery 232. The peripheral elements 236 are formed of fiber material 248 and provided for additional reinforcement, although the peripheral elements 236 may be formed of other materials and/or may be provided in greater or fewer locations. In other embodiments, the peripheral elements 236 may be located farther inwardly from the periphery 232 or, alternatively, there may not be any peripheral elements 236 provided. With reference to Table 1, the second composite layer 404b comprises a layer thickness TL of 0.1 mm and layer volume VL of 1.57 cm³, of which the fiber material 248 makes up 96.8%.

Figure 12:
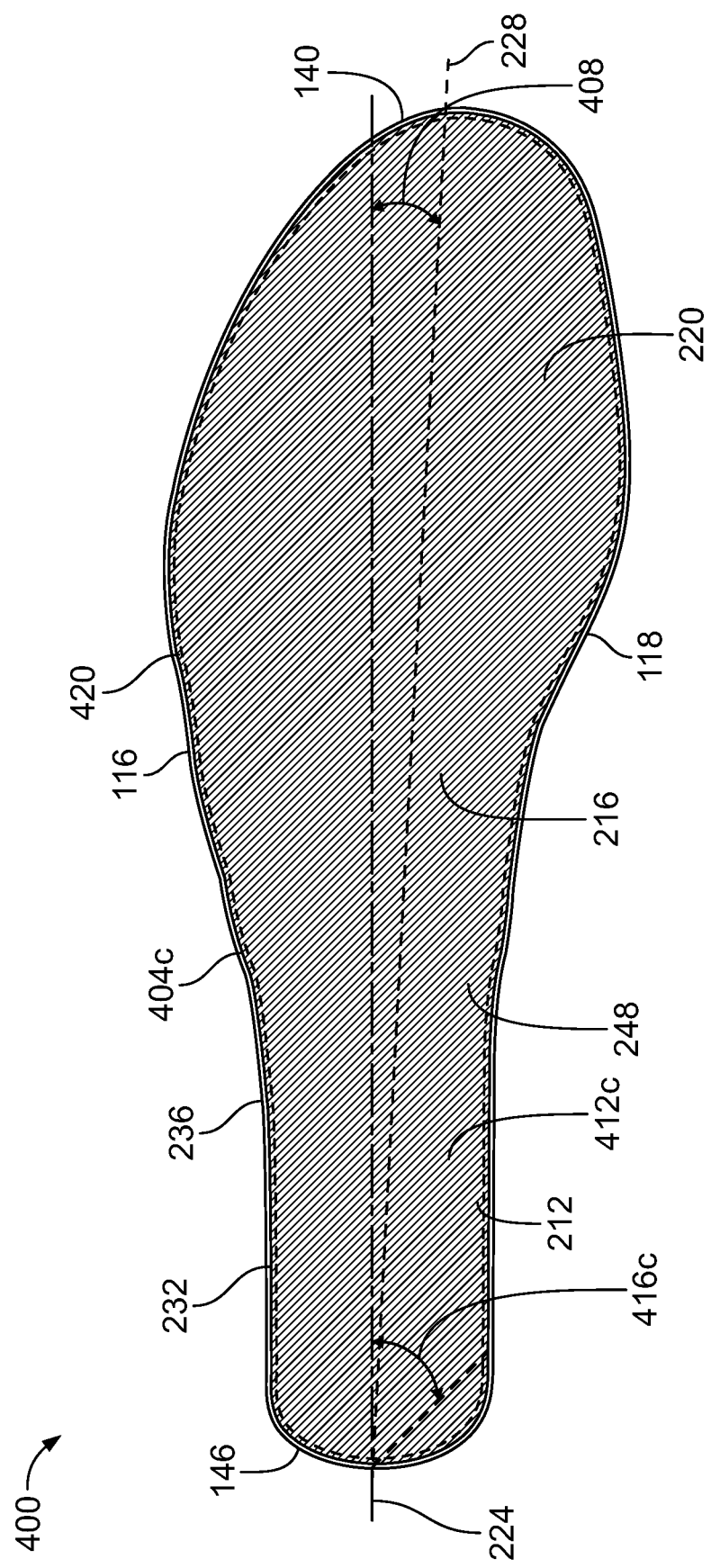

Referring to FIG. 12, the plate 400 includes the third composite layer 404c that comprises the continuous strand of fiber material 248 printed in a second fiber array 412c that is oriented at a second fiber angle 416c relative to the reference axis 224. In the illustrated embodiment, the second fiber angle 416c is about −45 degrees. Thus, the second fiber angle 416c is different from the first fiber angle 416b (not shown). Further, the second fiber array 412c of the third composite layer 404c includes the turns 420 arranged along portions of the periphery 232 of the plate 400. Further, the third composite layer 404c includes peripheral elements 236 that are engaged with one or more of the turns 420 along various portions of the second fiber array 412c near the periphery 232. With reference to Table 1, the third composite layer 404c comprises a layer thickness TL of 0.1 mm and layer volume VL of 1.56 cm³, of which the fiber material 248 makes up 96.8%.

Figure 13:
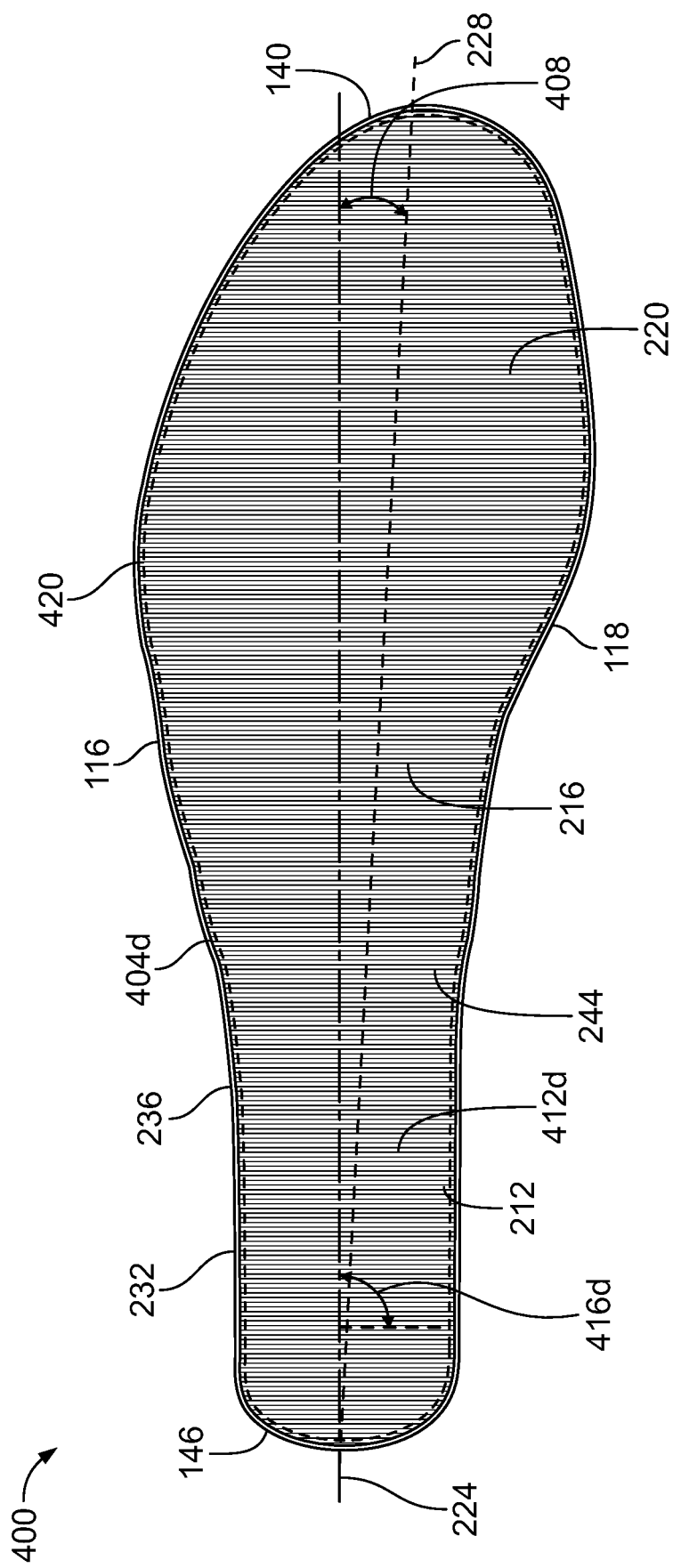

Referring to FIG. 13, the plate 400 includes the fourth composite layer 404d that comprises the continuous strand of fiber material 248 printed in a third fiber array 412d that is oriented at a third fiber angle 416d relative to the reference axis 224. In the illustrated embodiment, the third fiber angle 416d is about 90 degrees. Thus, the third fiber angle 416d is different from the second fiber angle 416c. Further, the third fiber array 412d of the fourth composite layer 404d includes the turns 420 arranged along portions of the periphery 232 of the plate 400. Further, the fourth composite layer 404d includes peripheral elements 236 that are engaged with one or more of the turns 420 along various portions of the third fiber array 412d near the periphery 232. With reference to Table 1, the fourth composite layer 404d comprises a layer thickness TL of 0.1 mm and layer volume VL of 1.53 cm³, of which the fiber material 248 makes up 98.0%.

Figure 14:
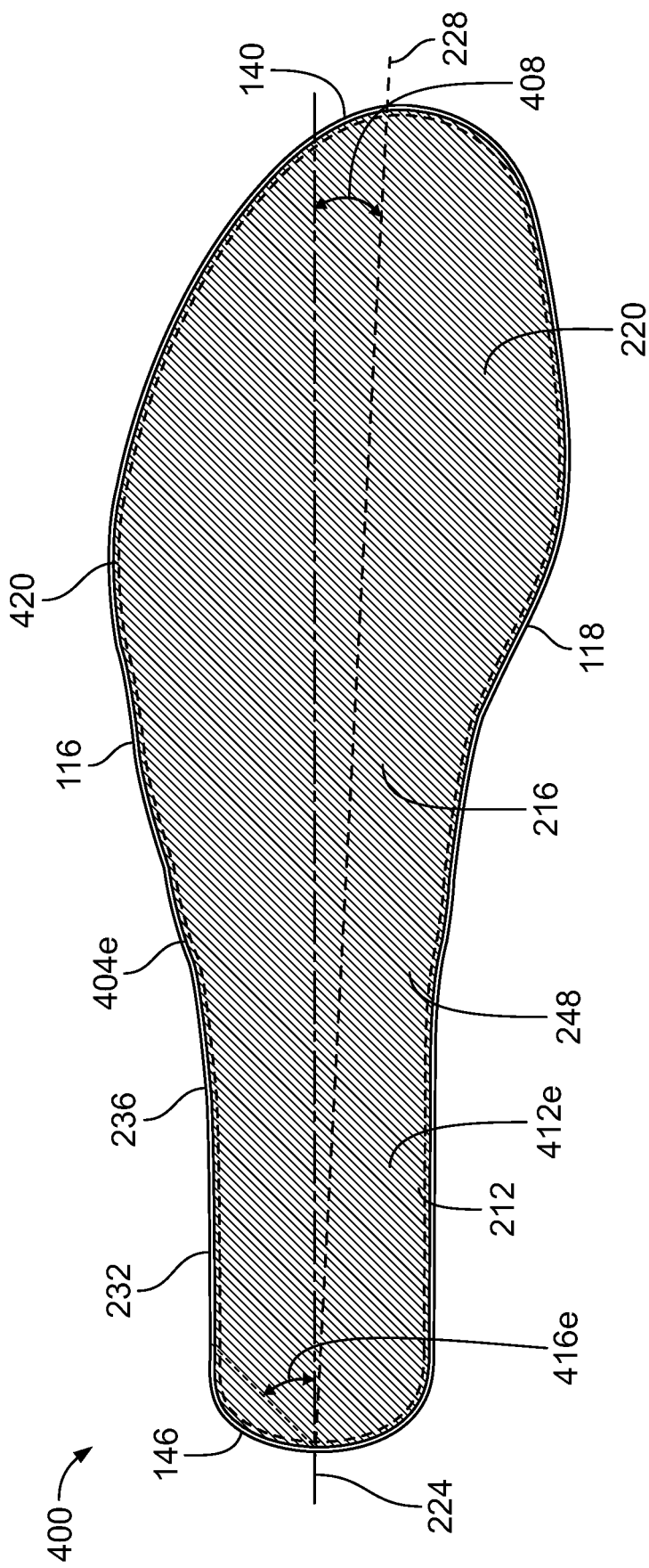

Referring to FIG. 14, the plate 400 includes the fifth composite layer 404e that comprises the continuous strand of fiber material 248 printed in a fourth fiber array 412e that is oriented at a fourth fiber angle 416e relative to the reference axis 224. In the illustrated embodiment, the fourth fiber angle 416e is about 45 degrees. Thus, the fourth fiber angle 416e is different from the third fiber angle 416d. Further, the fourth fiber array 412e of the fifth composite layer 404e includes the turns 420 arranged along portions of the periphery 232 of the plate 400. Further, the fifth composite layer 404e includes peripheral elements 236 that are engaged with one or more of the turns 420 along various portions of the fourth fiber array 412e near the periphery 232. With reference to Table 1, the fifth composite layer 404e comprises a layer thickness TL of 0.1 mm and layer volume VL of 1.56 cm$^3$, of which the fiber material makes up 96.8%.

Figure 15:
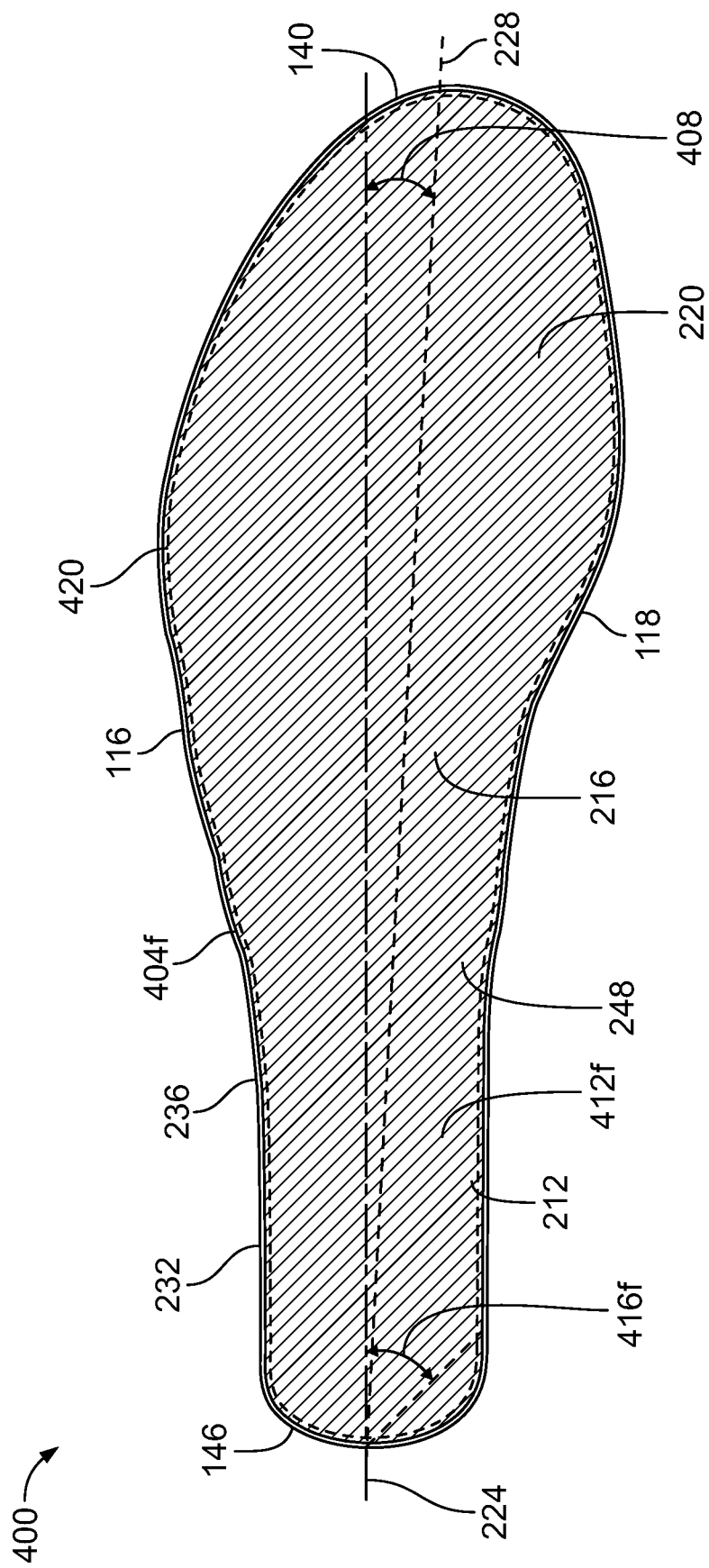

Referring to FIG. 15, the plate 400 includes the sixth composite layer 404f that comprises the continuous strand of fiber material 248 printed in a fifth fiber array 412f that is oriented at a fifth fiber angle 416f relative to the reference axis 224. In the illustrated embodiment, the fifth fiber angle 416f is about −45 degrees. Thus, the fifth fiber angle 416f is different from the fourth fiber angle 416e. Further, the fifth fiber array 412f of the sixth composite layer 404f includes the turns 420 arranged along portions of the periphery 232 of the plate 400. Further, the sixth composite layer 404f includes peripheral elements 236 that are engaged with one or more of the turns 420 along various portions of the fifth fiber array 412f near the periphery 232. With reference to Table 1, measurements are provided for the sixth composite layer 404f, which comprises a layer thickness TL of 0.1 mm and layer volume VL of 1.54 cm$^3$, of which the fiber material 248 makes up 96.8%.

Figure 16:
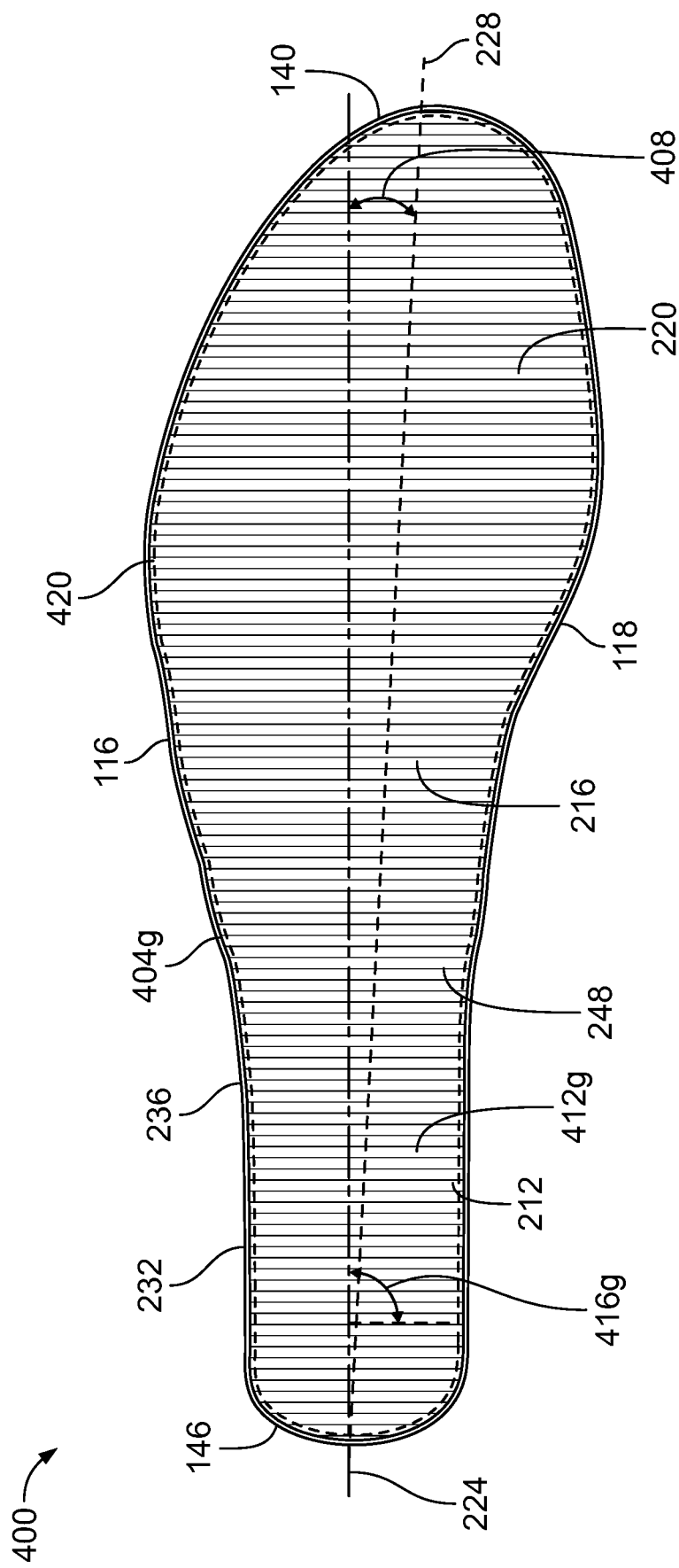

Referring to FIG. 16, the plate 400 includes the seventh composite layer 404g that comprises the continuous strand of fiber material 248 printed in a sixth fiber array 412g that is oriented at a sixth fiber angle 416g relative to the reference axis 224. In the illustrated embodiment, the sixth fiber angle 416g is about 90 degrees. Thus, the sixth fiber angle 416g is different from the fifth fiber angle 416f. Further, the sixth fiber array 412g of the seventh composite layer 404g includes the turns 420 arranged along portions of the periphery 232 of the plate 400. Further, the seventh composite layer 404g includes peripheral elements 236 that are engaged with one or more of the turns 420 along various portions of the sixth fiber array 412g near the periphery 232. With reference to Table 1, the seventh composite layer 404g comprises a layer thickness TL of 0.1 mm and layer volume VL of 1.54 cm$^3$, of which the fiber material 248 makes up 98.0%.

Figure 17:
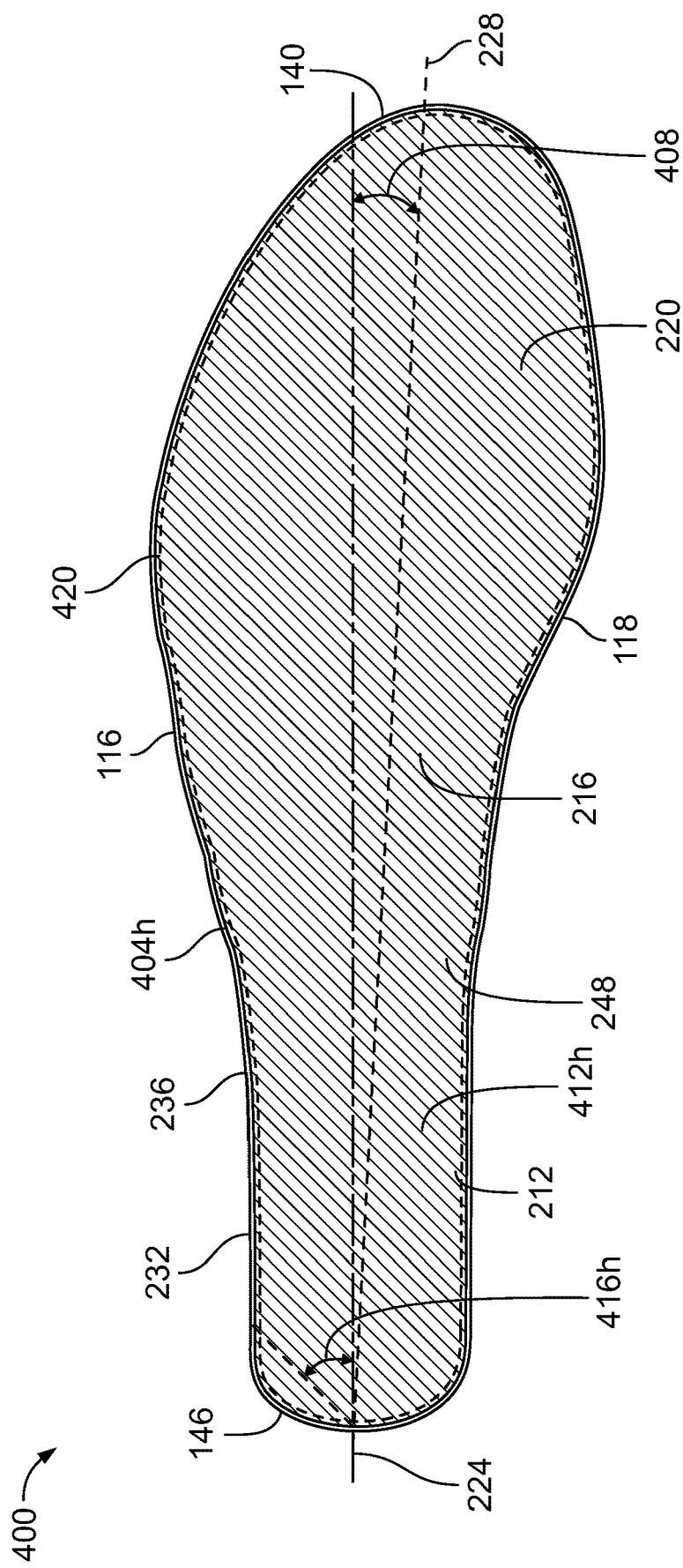

Referring to FIG. 17, the plate 400 includes the eighth composite layer 404h that comprises the continuous strand of fiber material 248 printed in a seventh fiber array 412h that is oriented at a seventh fiber angle 416h relative to the reference axis 224. In the illustrated embodiment, the seventh fiber angle 416h is about 90 degrees. Thus, the seventh fiber angle 416h is different from the sixth fiber angle 416g. Further, the seventh fiber array 412h of the eighth composite layer 404h includes the turns 420 arranged along portions of the periphery 232 of the plate 400. Further, the eighth composite layer 404h includes peripheral elements 236 that are engaged with one or more of the turns 420 along various portions of the seventh fiber array 412h near the periphery 232. With reference to Table 1, the eighth composite layer 404h comprises a layer thickness TL of 0.1 mm and layer volume VL of 1.56 cm$^3$, of which the fiber material 248 makes up 96.8%.

Accordingly, one example CFF technique includes the deposition of numerous layers of continuous strands of fiber material 248, stacked or arranged vertically in consecutive composite layers 404, disposed in different arrays 412, and disposed at varying angles 416 relative to the reference axis 224. Further, each fiber array 412 comprises a continuous strand of fiber material 248 that extends continuously in-plane between the toe end 140 and the heel end 146 of the plate 400. That is, the CFF technique employed to manufacture the plate 400 includes several composite layers 404 in which the fiber material 248 is deposited in the fiber array 412 that is uniform and continuous throughout the posterior segment 212, the arch segment 216, and the anterior segment 220, and the fiber array 412 is also uniform between the medial side 118 and the lateral side 116 of the plate 400. Further, each fiber array 412 is comprised of a continuous strand of fiber material 248 that is distinct and separate from the fiber array 412 of the adjacent composite layer 404. To that end, the cutter (not shown) of the printer 300 is used to delimit the continuous strand of each fiber array 412.

Additionally, the fiber angle 416 is different from the fiber angle 416 of the adjacent composite layer 404. Further, the fiber array 412 of each composite layer 404 defines a fiber surface area F SAL of the composite layer 404, such that the fiber array 412 can be quantified as a percentage of the total surface area SAL defined by the composite layer 404. In one instance, the fiber array 412 comprises at least about 90% of the layer surface area SAL. Because the composite layer 404 extends across the entire plate 400 and, in part, defines the plate 400 and the periphery 232 thereof, the layer surface area SAL is generally equivalent to the in-plane surface area (SAP) of the plate 400. Thus, the fiber surface area FSAL of the fiber array 412 corresponds to the in-plane surface area SAP of the plate 400. To that end, the fiber array 412 is printed continuously across substantially the entire in-plane surface area SAP of the plate 400, meaning that the fiber array 412 comprises at least about 90% of the in-plane surface area SAP of the plate 400. It will be appreciated that the fiber percentage FPL of the layer volume VL corresponds proportionally to the fiber surface area FSAL covered by the fiber array 412. However, in some embodiments, the fiber percentage FPL may not correspond to the fiber surface area FSAL due to the introduction of tertiary elements and/or materials, or due to concentrations of fiber material 248 within particular regions or segments of the composite layer 404 and/or plate 400. In some embodiments, the fiber surface area FSAL of each fiber array 412 is different from the fiber surface FSAL of the fiber array 412 of the adjacent composite layer 404.

Figure 18:
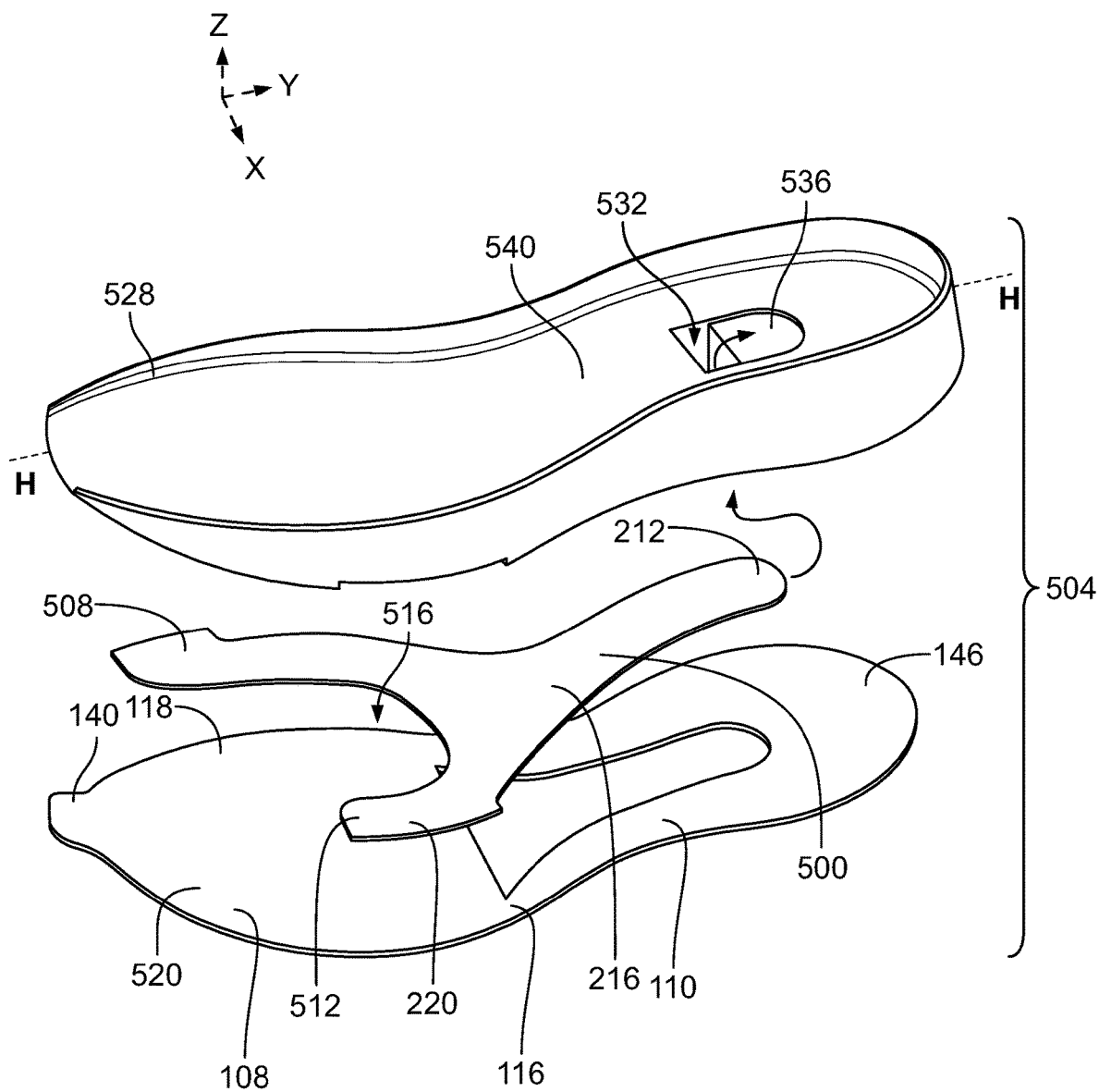
FIG. 18 is an exploded view of another embodiment of a sole structure incorporating still another embodiment of a plate.

With reference to FIG. 18, another embodiment of a plate 500 is provided for use within a sole structure 504 for the article of footwear 100. The plate 500 and the sole structure 504 of FIG. 18 have similarities to the plates 200, 400 and sole structure 104; thus, like reference numerals are used to indicate like elements. In FIG. 18, the plate 500 includes a medial fork 508 and a lateral fork 512 that are separated by a gap 516 within the anterior segment 220. The plate 500 narrows, i.e., measured in the X direction, relative to the reference plane 224 moving in the longitudinal direction toward the heel end 146. That is, the plate 500 narrows from the anterior segment 220 to the arch segment 216 and also narrows from the arch segment 216 to the posterior segment 212. In the illustrated embodiment, the sole 504 further includes an outsole 520 and a midsole 528 to which the plate 500 is attached.

The plate 500 is manufactured by additive manufacturing, similar to the plates 200 and 400, such that the plate 500 includes a plurality of composite layers (not shown) comprising fibers material 248 and substrate material 244 in various orientations. As a result, the plate 500 is sized and shaped to have customized bending resistance BR and torsional resistance TR. For example, due to the position of the gap 516 between the medial fork 508 and the lateral fork 512, the anterior segment 220 of the plate 500 has a smaller material volume VL and VT than those of the plates 200, 400. Accordingly, the bending resistant BR and the torsional resistance TR are reduced in comparison to those of the plates 200, 400. Additionally, the posterior segment 212 also defines reduced VL and VT than those of the plates 200, 400. However, the arch segment 216 of the plate 500 defines equal or greater VT and VL than those of the plates 200, 400. As such, the plate 500 is tuned to provide particular bending resistance BR and torsional resistance TR in comparison to the plates 200, 400 by changing the shape and size of the plate 500.

Additionally, the medial fork 508 and the lateral fork 512 of the plate 500 may be configured to have different properties from one another. For example, the medial fork 508 may have a greater stiffness, e.g., bending resistance BR, than that of the lateral fork 512 for providing the user with increased propulsion near the inside or medial portion of the ball of the foot, i.e., near the hallux. In contrast, the lateral fork 512 can be provided with increased flexibility, e.g., lower bending resistance BR, than that of the medial fork 508 for providing the user with increased comfort near the outside or lateral side of the ball of the foot, e.g., near the distal toe.

Further, referring to FIGS. 1-3 and 18, the plate 500 is provided as part of a sole structure 504 that is configured to be assembled with the upper 102. In particular, the plate 500 is configured to be positioned between the outsole 520 and the upper 102, such that the plate 500 is in contact with both the outsole 520 and the upper 102. To that end, the plate 500 extends through the midsole 528 and, specifically, the posterior segment 212 of the plate 500 extends through a slot 532 formed through the midsole 528. In the illustrated embodiment, the plate 500 curves gradually along the anterior segment 220 and the arch segment 216 relative to the horizontal plane H, and the plate 500 has an increased curvature relative to the horizontal plane H along the arch segment 216 and the posterior segment 212 as compared to the curvature in the anterior segment 220.

When assembled, the posterior segment 212 of the plate 500 rests on a platform 536 to be flush with a bed 540 of the midsole 528. When the upper 102 is attached to the midsole 528, the insole 126 of the upper 102 is positioned along the bed 540 and the posterior segment 212 of the plate 500. Accordingly, when the sole 504 is assembled, the plate 500 is disposed at a downward angle relative to a horizontal plane H extending in the X and Y directions and that is coplanar with at least a portion of the bed 540 of the midsole 528 and/or the insole 126 of the upper 102. The downward angle is at least about 5 degrees, but may be 10 degrees or greater. At such a downward angle and in combination with the particular curvature, the plate 500 is configured to deflect under applied loading during use, which causes the plate 500 to spring-back and, thus, to provide propulsion to the user's gait at light loads, e.g., mere walking strides. In combination with the particular shape and size of the plate 500, as mentioned above, the plate 500 is arranged within the sole 504 to increase reactivity, whereby propulsion is effected more easily, i.e., at lighter applied loads, in comparison to a plate that is laid flat along the midsole 528.

Accordingly, the plates 200, 400, 500 can be formed of various shapes and sizes and provided as part of the footwear 100, such as in the sole 104 or the upper 102. In some embodiments, the plate 400 is provided as part of the upper 102, such as a part of the insole 126. The plates 200, 400, 500 can be configured to be at least partially customized to influence or enhance gait, stance, posture, propulsion, and agility, among other needs. For example, the plates 200, 400, 500 may be configured to alleviate pain and/or improve performance for users with medical issues or deformities. Fiber reinforcement can increase stiffness in a localized area of the plates 200, 400, such as in the posterior segment 212, the anterior segment 220, or the arch segment 216, or some combination thereof. In addition, stiffness can be increased by arrays and orientations of fibers made of generally rigid materials, or by depositing, e.g., printing, fiber materials in arrays that are more compact and dense, or by adding additional composite layers in particular areas, or by depositing fibers about the periphery 232. As such, bending resistance BR and torsional resistance TR, which account for and relate to the moment of inertia MOI and elastic modulus values, may be increased and customized for particular applications. Fiber reinforcement can also provide directional stiffness in localized areas of the plates 200, 400, 500 as well as quasi-isotropic QI properties by implementing additive manufacturing methods using CFF techniques.

Figure 19:
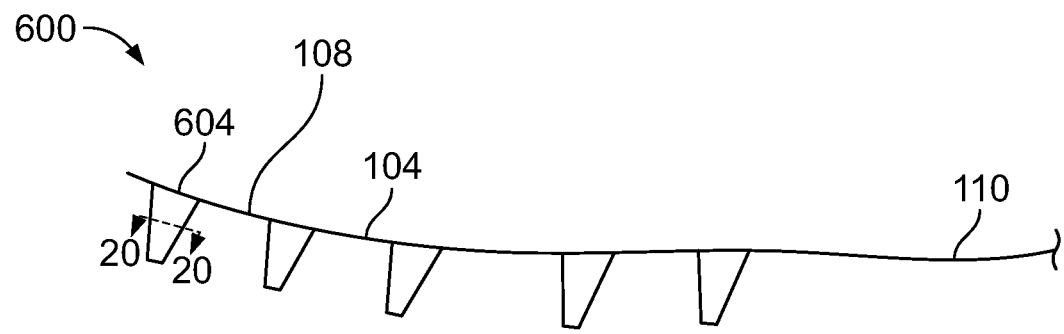
FIG. 19 is a schematic representation of a side elevational view of yet another embodiment of a plate, the plate being configured as an outsole having traction elements.
Figure 20:
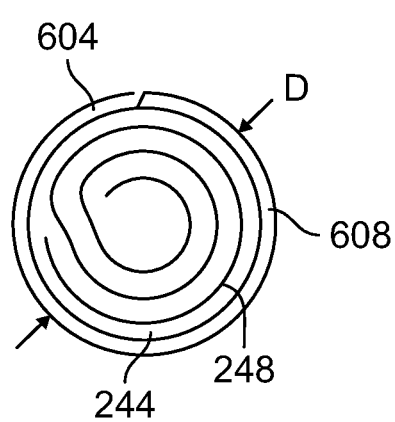
FIG. 20 is a schematic representation of a sectional view of a traction element taken along the line 20-20 of FIG. 19.

FIG. 19 depicts another embodiment of a plate 600 that is manufactured by the additive manufacturing processes described above. The plate 600 is configured as a unitary sole structure 104, such that the plate 600 comprises the entire sole structure 104 to which the upper 102 (see FIGS. 1-3) is attached. In particular, the plate 600 includes a plurality of traction element 604 monolithically provided as part of the plate 600. Accordingly, the same additive manufacturing process and, in some instances, the same materials can be used to manufacture the plate 600 and the traction elements 604. Thus, the traction elements 604 are composite elements including the substrate material 244 and the fiber material 248, as described above in connection with FIGS. 1-18. Referring to FIG. 20, which is a sectional view of one of the traction elements 604 of FIG. 19, the fiber material 248 is wound in a concentric circular path within the traction element 604. Further, the traction element 604 defines an outer diameter D that narrows as the traction element 604 extends away from the plate 600. Accordingly, the concentric circular path of the fiber material 248 tightens or expands within the traction element 604 in proportion to the diameter D. In this way, the traction element 604 is reinforced to have similar strength-to-weight properties as the plates 200, 400, 500 described above.

Figure 21:
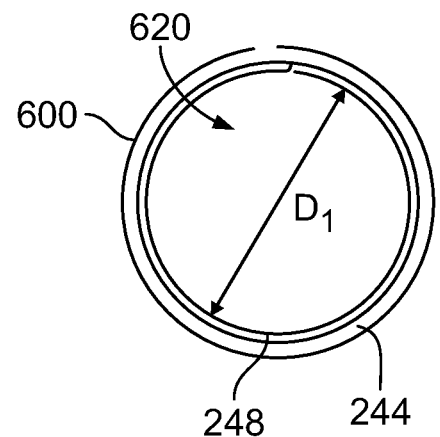
FIG. 21 is a schematic representation of a top plan view of an aperture of the plate of FIG. 19.

Referring to FIG. 21, a schematic representation of an example of an aperture 620 that can be provided within the plate 600 is provided. In the illustrated embodiment, the fiber material 248 extends in a concentric circular path about the aperture 620 and in proportion to a diameter D1 defined by the aperture 620. In this way, the fiber material 248 is used to reinforce the aperture 620 of the plate 600. Such apertures 620 may be formed within the plate 600 as a through-hole, or within the plate 600 as a void or cavity that is not exposed externally of the plate 600.

It is contemplated that any of the plates described in the present disclosure may include embedded functionality that is additional to the structural stiffness properties described above. For example, it is contemplated that the fiber material 248 may have or be modified to have electrically conductive materials, thermally conductive materials, electrically insulative materials, thermally insulated materials, optically transmissive materials, or fluidically transmissive materials. Additionally or alternatively, a device (not shown) may be embedded within any of the plates of this disclosure. In one instance, the device (not shown) may be a sensor, e.g., a transducer, an accelerometer, a geolocation sensor, a temperature sensor, a humidity sensor, or a moisture sensor. Further, the device (not shown) may be capable of providing haptic feedback to a user, such that a user can be notified to avoid prolonged periods of standing or sitting or immobility. Also, the device (not shown) may be an object or structural element, such as, e.g., an air-filled or fluid-filled bladder or pod. It is further contemplated that the device (not shown) may be capable of harvesting and storing energy caused by deformation of the plate and/or footwear during use, such as, e.g., piezoelectric transducers.

In other embodiments, other configurations are possible. For example, certain features and combinations of features that are presented with respect to particular embodiments in the discussion above can be utilized in other embodiments and in other combinations, as appropriate. Further, any of the embodiments described herein may be modified to include any of the structures or methodologies disclosed in connection with other embodiments. Additionally, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, it will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

I claim:

1. A method of manufacturing a component for a sole structure of an article of footwear, the method comprising:
providing a three-dimensional printer having a platform, a first head that receives a first feed, and a second head that receives a second feed;
printing a base layer on the platform, the base layer comprising a substrate material and defining a longitudinal axis,
printing a first fiber layer continuously on the base layer, the first fiber layer defining a first fiber orientation that is disposed at a first angle relative to the longitudinal axis;
printing a second fiber layer continuously on the first fiber layer, the second fiber layer defining a second fiber orientation that is disposed at a second angle relative to the longitudinal axis, wherein the first angle is different from the second angle; and
treating a printed model in a compression molding process, wherein the printed model comprises at least the base layer, the first fiber layer, and the second fiber layer.

2. The method of claim 1, wherein the first fiber layer comprises at least 60% of substrate material.

3. The method of claim 1, wherein the second fiber layer comprises at least 50% of fiber material.

4. The method of claim 1, wherein the first fiber layer and the second fiber layer define different layer volumes.

5. The method of claim 4, wherein the first fiber layer includes at least one of a carbon fiber, an aramid fiber, a boron fiber, or a glass fiber.

6. The method of claim 1, wherein the printed model comprises at least five fiber layers.

7. The method of claim 1, wherein the printed model comprises an arch segment extending between a posterior segment and an anterior segment.

8. The method of claim 1, wherein a transparent resin is applied to the printed model within the compression mold.

9. The method of claim 1, wherein the printed model includes a third fiber layer defining a third fiber orientation that is disposed at a third angle relative to the longitudinal axis, the third angle being equal to the first angle and the third fiber layer being separated from the first fiber layer by the second fiber layer.

10. A plate for a sole structure of an article of footwear, the footwear comprising an upper having an insole, the plate comprising:
a medial side that is opposite a lateral side;
a heel end that is opposite a toe end;
a base layer comprising a substrate material; and
a plurality of composite layers coupled to the base layer, wherein each of the composite layers comprises a first volume of base material and a second volume of fiber material,
wherein the first volume of base material and the second volume of fiber material are different,
wherein each of the composite layers defines a fiber orientation, the fiber orientation being different between adjacent composite layers, and
wherein the plate is printed layer-by-layer to define a top side and a bottom side, at least a portion of the top side being spaced apart from the insole of the upper.

11. The plate of claim 10, wherein the composite layers are arranged as a stack between a top side and bottom side of the plate and the stack has quasi-isotropic properties.

12. The plate of claim 11, wherein each of the composite layers has anisotropic properties, the anisotropic properties being different between adjacent composite layers.

13. The plate of claim 12, wherein the anisotropic properties include at least one of a bending resistance, a torsional resistance, or a tensile stiffness.

14. The plate of claim 10, wherein the first volume of base material is less than the second volume of fiber material.

15. The plate of claim 10, wherein the second volume of fiber material includes at least one of carbon fibers, aramid fibers, boron fibers, or glass fibers.

16. A method of using a three-dimensional printer and a compression mold for producing a plate for an article of footwear, comprising:
providing a feed of substrate material that is fed to a first head of the printer;
providing a feed of a fiber material that is fed to a second head of the printer;

providing a preformed model on a platform within the printer; and providing a design model to the printer, wherein the first head and the second head are selectively activated and deactivated to print at least two composite layers on the preformed model, and wherein the at least two composite layers are separated from the preformed model and received within the compression mold.

17. The method of claim 16, wherein each of the at least two composite layers comprises a continuous fiber strand that is applied by the second head.

18. The method of claim 16, wherein the plate includes an anterior segment having a first stiffness, an arch segment having a second stiffness, and a posterior segment having a third stiffness.

19. The method claim 18, wherein the first stiffness is greater than the second stiffness and the third stiffness is greater than the first stiffness.

20. The method of claim 18, wherein the first stiffness, the second stiffness, and the third stiffness are equal.

\* \* \* \* \*